US012446774B2

(12) United States Patent
Hernandez et al.

(10) Patent No.: US 12,446,774 B2
(45) Date of Patent: Oct. 21, 2025

(54) APPARATUS, SYSTEMS, AND METHODS FOR OBJECTIVELY ASSESSING ACCOMMODATION IN AN EYE

(71) Applicant: Alcon Inc., Fribourg (CH)

(72) Inventors: Victor Manuel Hernandez, Fort Worth, TX (US); Armin Soltan Zadi, Fort Worth, TX (US); Robert Demitri Angelopoulos, San Jose, CA (US); Terah Whiting Smiley, Davis, CA (US); Madison McGOUGH, Fort Worth, TX (US); Vidhyapriya Sreenivasan, Fort Worth, TX (US)

(73) Assignee: Alcon Inc., Fribourg (CH)

( * ) Notice: Subject to any disclaimer, the term of this patent is extended or adjusted under 35 U.S.C. 154(b) by 885 days.

(21) Appl. No.: 17/655,768

(22) Filed: Mar. 21, 2022

(65) Prior Publication Data

US 2022/0313080 A1      Oct. 6, 2022

Related U.S. Application Data

(60) Provisional application No. 63/261,801, filed on Sep. 29, 2021, provisional application No. 63/171,320, filed on Apr. 6, 2021.

(51) Int. Cl.
*A61B 3/103* (2006.01)
*A61B 3/00* (2006.01)
(Continued)

(52) U.S. Cl.
CPC ............ *A61B 3/103* (2013.01); *A61B 3/0075* (2013.01); *A61B 3/032* (2013.01); *A61B 3/04* (2013.01);
(Continued)

(58) Field of Classification Search
CPC .. A61B 3/032; A61B 3/04; A61B 3/09; A61B 3/103; A61B 2560/045;
(Continued)

(56) References Cited

U.S. PATENT DOCUMENTS 3,278,654 A    10/1966   Grandperret
3,846,013 A    11/1974   Cohen
(Continued)

FOREIGN PATENT DOCUMENTS

CN         1283974        2/2001
CN         1367667        9/2002
(Continued)

OTHER PUBLICATIONS

Baughman et al. "Negative poisson's ratios for extreme states fo matter," *Science*, vol. 288, pp. 2018-2022, Jun. 16, 2000.
(Continued)

*Primary Examiner* — Brandi N Thomas
(74) *Attorney, Agent, or Firm* — Levine Bagade Han LLP

(57) ABSTRACT

Disclosed are apparatus, systems, and methods for objectively assessing accommodation in an eye. For example, a method for objectively assessing accommodation can comprise displaying, at a far display, a stimulus target for a first duration and displaying, at a near display, the stimulus target for a second duration. The stimulus target displayed at the near display can be projected onto a first beam splitter positioned at an oblique angle with respect to the near display. The stimulus target displayed on the far display can be axially aligned with the stimulus target projected onto the first beam splitter. The method can also comprise obtaining, at a controller, measurements concerning refractive states of the eye during the first duration and the second duration from a refractor device in communication with the controller and determining, using the controller, an accommodative
(Continued)

response of the eye based in part on the respective refractive states.

20 Claims, 11 Drawing Sheets

(51) Int. Cl.
  *A61B 3/032* (2006.01)
  *A61B 3/04* (2006.01)
  *A61B 3/10* (2006.01)
  *A61B 3/15* (2006.01)
(52) U.S. Cl.
  CPC ............ *A61B 3/1015* (2013.01); *A61B 3/152* (2013.01); *A61B 2560/045* (2013.01)
(58) Field of Classification Search
  CPC ..... A61B 3/152; A61B 3/0041; A61B 3/0025; A61B 3/0091; A61B 3/1005
  See application file for complete search history.

(56) References Cited

U.S. PATENT DOCUMENTS

| | | |
|---|---|---|
| 4,111,995 A | 9/1978 | Nelson |
| 4,251,887 A | 2/1981 | Anis |
| 4,253,199 A | 3/1981 | Banko |
| 4,254,509 A | 3/1981 | Tennant |
| 4,258,311 A | 3/1981 | Tokuda et al. |
| 4,304,895 A | 12/1981 | Loshaek |
| 4,373,218 A | 2/1983 | Schachar |
| 4,409,691 A | 10/1983 | Levy |
| 4,423,809 A | 1/1984 | Mazzocco |
| 4,435,855 A | 3/1984 | Pannu |
| 4,435,856 A | 3/1984 | L'esperance |
| 4,466,705 A | 8/1984 | Michelson |
| 4,490,860 A | 1/1985 | Rainin |
| 4,494,254 A | 1/1985 | Lopez |
| 4,512,040 A | 4/1985 | Mcclure |
| 4,528,311 A | 7/1985 | Beard et al. |
| 4,575,373 A | 3/1986 | Johnson |
| 4,585,457 A | 4/1986 | Kalb |
| 4,604,295 A | 8/1986 | Humphreys |
| 4,615,701 A | 10/1986 | Woods |
| 4,620,954 A | 11/1986 | Singer et al. |
| 4,685,921 A | 8/1987 | Peyman |
| 4,685,922 A | 8/1987 | Peyman |
| 4,693,717 A | 9/1987 | Michelson |
| 4,720,286 A | 1/1988 | Bailey et al. |
| 4,731,078 A | 3/1988 | Stoy et al. |
| 4,731,079 A | 3/1988 | Stoy |
| 4,731,080 A | 3/1988 | Galin |
| 4,764,423 A | 8/1988 | Yamaguchi et al. |
| 4,784,485 A | 11/1988 | Ho |
| 4,787,903 A | 11/1988 | Grendahl |
| 4,790,847 A | 12/1988 | Woods |
| 4,813,956 A | 3/1989 | Gupta |
| 4,816,031 A | 3/1989 | Pfoff |
| 4,836,201 A | 6/1989 | Patton et al. |
| 4,842,601 A | 6/1989 | Smith |
| 4,848,343 A | 7/1989 | Wallsten et al. |
| 4,888,012 A | 12/1989 | Horn et al. |
| 4,892,543 A | 1/1990 | Turley |
| 4,902,293 A | 2/1990 | Feaster |
| 4,913,536 A | 4/1990 | Barnea |
| 4,919,151 A | 4/1990 | Grubbs et al. |
| 4,932,966 A | 6/1990 | Christie et al. |
| 4,946,469 A | 8/1990 | Sarfarazi |
| 4,950,289 A | 8/1990 | Krasner |
| 4,963,148 A | 10/1990 | Sulc et al. |
| 4,994,082 A | 2/1991 | Richards et al. |
| 4,995,879 A | 2/1991 | Dougherty |
| 4,995,880 A | 2/1991 | Galib |
| 5,015,254 A | 5/1991 | Greite |
| 5,035,710 A | 7/1991 | Nakada et al. |
| 5,047,051 A | 9/1991 | Cumming |
| 5,061,914 A | 10/1991 | Busch et al. |
| 5,066,301 A | 11/1991 | Wiley |
| 5,078,740 A | 1/1992 | Walman |
| 5,145,884 A | 9/1992 | Yamamoto et al. |
| 5,145,935 A | 9/1992 | Hayashi |
| 5,152,789 A | 10/1992 | Willis |
| 5,169,920 A | 12/1992 | Okawa |
| 5,171,266 A | 12/1992 | Wiley et al. |
| 5,200,430 A | 4/1993 | Federman |
| 5,201,763 A | 4/1993 | Brady et al. |
| 5,203,788 A | 4/1993 | Wiley |
| 5,213,579 A | 5/1993 | Yamada et al. |
| 5,217,491 A | 6/1993 | Vanderbilt et al. |
| 5,224,957 A | 7/1993 | Gasser et al. |
| 5,235,003 A | 8/1993 | Ward et al. |
| 5,251,993 A | 10/1993 | Sigourney |
| 5,275,623 A | 1/1994 | Sarfarazi |
| 5,275,624 A | 1/1994 | Hara et al. |
| 5,288,293 A | 2/1994 | O'Donnell |
| 5,290,892 A | 3/1994 | Namdaran et al. |
| 5,326,347 A | 7/1994 | Cumming |
| 5,391,590 A | 2/1995 | Gerace et al. |
| 5,405,386 A | 4/1995 | Rheinish et al. |
| 5,426,166 A | 6/1995 | Usifer et al. |
| 5,443,506 A | 8/1995 | Garabet |
| 5,444,106 A | 8/1995 | Zhou et al. |
| 5,444,135 A | 8/1995 | Cheradame et al. |
| 5,476,514 A | 12/1995 | Cumming |
| 5,483,305 A | 1/1996 | Kohayakawa |
| 5,489,302 A | 2/1996 | Skottun |
| 5,496,366 A | 3/1996 | Cumming |
| 5,506,300 A | 4/1996 | Ward et al. |
| 5,512,609 A | 4/1996 | Yang |
| 5,567,365 A | 10/1996 | Weinschenk et al. |
| 5,578,081 A | 11/1996 | Mcdonald |
| 5,585,049 A | 12/1996 | Grisoni et al. |
| 5,593,436 A | 1/1997 | Langerman |
| 5,607,472 A | 3/1997 | Thompson |
| 5,628,795 A | 5/1997 | Langerman |
| 5,633,504 A | 5/1997 | Collins et al. |
| 5,665,822 A | 9/1997 | Bitler et al. |
| 5,674,282 A | 10/1997 | Cumming |
| 5,676,669 A | 10/1997 | Colvard |
| 5,693,095 A | 12/1997 | Freeman et al. |
| 5,697,973 A | 12/1997 | Peyman et al. |
| 5,702,441 A | 12/1997 | Zhou |
| 5,774,273 A | 6/1998 | Bornhorst |
| 5,776,191 A | 7/1998 | Mazzocco |
| 5,776,192 A | 7/1998 | Mcdonald |
| 5,800,533 A | 9/1998 | Eggleston et al. |
| 5,843,188 A | 12/1998 | Mcdonald |
| 5,891,931 A | 4/1999 | Leboeuf et al. |
| 5,928,282 A | 7/1999 | Nigam |
| 5,964,802 A | 10/1999 | Anello et al. |
| 5,968,095 A | 10/1999 | Norrby |
| 5,984,962 A | 11/1999 | Anello et al. |
| 6,013,101 A | 1/2000 | Israel |
| 6,015,842 A | 1/2000 | Leboeuf et al. |
| 6,045,745 A | 4/2000 | Reno |
| 6,102,539 A | 8/2000 | Tucker |
| 6,117,171 A | 9/2000 | Skottun |
| 6,124,980 A | 9/2000 | Cerbell |
| 6,139,576 A | 10/2000 | Doyle et al. |
| 6,160,084 A | 12/2000 | Langer et al. |
| 6,176,878 B1 | 1/2001 | Gwon et al. |
| 6,180,687 B1 | 1/2001 | Hammer et al. |
| 6,188,526 B1 | 2/2001 | Sasaya et al. |
| 6,190,410 B1 | 2/2001 | Lamielle et al. |
| 6,195,807 B1 | 3/2001 | Chou |
| 6,197,059 B1 | 3/2001 | Cumming |
| 6,217,612 B1 | 4/2001 | Woods |
| 6,225,367 B1 | 5/2001 | Chaouk et al. |
| 6,229,641 B1 | 5/2001 | Kosaka |
| 6,299,641 B1 | 10/2001 | Woods |
| 6,302,911 B1 | 10/2001 | Hanna |
| 6,322,589 B1 | 11/2001 | Cumming |
| 6,342,073 B1 | 1/2002 | Cumming et al. |
| 6,348,437 B1 | 2/2002 | Avery et al. |

(56) References Cited

U.S. PATENT DOCUMENTS

| | | |
|---|---|---|
| 6,387,126 B1 | 5/2002 | Cumming |
| 6,388,043 B1 | 5/2002 | Langer et al. |
| 6,406,494 B1 | 6/2002 | Laguette et al. |
| 6,413,262 B2 | 7/2002 | Saishin et al. |
| 6,423,094 B1 | 7/2002 | Sarfarazi |
| 6,436,092 B1 | 8/2002 | Peyman |
| 6,443,985 B1 | 9/2002 | Woods |
| 6,450,642 B1 | 9/2002 | Jethmalani et al. |
| 6,464,725 B2 | 10/2002 | Skotton |
| 6,488,708 B2 | 12/2002 | Sarfarazi |
| 6,493,151 B2 | 12/2002 | Schachar |
| 6,503,276 B2 | 1/2003 | Lang et al. |
| 6,517,577 B1 | 2/2003 | Callahan et al. |
| 6,528,602 B1 | 3/2003 | Freeman et al. |
| 6,551,354 B1 | 4/2003 | Ghazizadeh et al. |
| 6,552,860 B1 | 4/2003 | Alden |
| 6,554,859 B1 | 4/2003 | Lang et al. |
| 6,585,768 B2 | 7/2003 | Hamano et al. |
| 6,589,550 B1 | 7/2003 | Hodd et al. |
| 6,592,621 B1 | 7/2003 | Domino |
| 6,599,317 B1 | 7/2003 | Weinschenk et al. |
| 6,601,956 B1 | 8/2003 | Jean et al. |
| 6,610,350 B2 | 8/2003 | Suzuki et al. |
| 6,616,691 B1 | 9/2003 | Tran |
| 6,616,692 B1 | 9/2003 | Glick et al. |
| 6,638,304 B2 | 10/2003 | Azar |
| 6,638,305 B2 | 10/2003 | Laguette |
| 6,638,306 B2 | 10/2003 | Cumming |
| 6,645,245 B1 | 11/2003 | Preussner |
| 6,645,246 B1 | 11/2003 | Weinschenk et al. |
| 6,656,223 B2 | 12/2003 | Brady |
| 6,660,035 B1 | 12/2003 | Lang et al. |
| 6,692,525 B2 | 2/2004 | Brady et al. |
| 6,695,881 B2 | 2/2004 | Peng et al. |
| 6,709,108 B2 | 3/2004 | Levine et al. |
| 6,712,848 B1 | 3/2004 | Wolf et al. |
| 6,730,123 B1 | 5/2004 | Klopotek |
| 6,743,388 B2 | 6/2004 | Sridharan et al. |
| 6,749,632 B2 | 6/2004 | Sandstedt et al. |
| 6,749,634 B2 | 6/2004 | Hanna |
| 6,786,934 B2 | 9/2004 | Zadno-Azizi et al. |
| 6,818,158 B2 | 11/2004 | Pham et al. |
| 6,827,738 B2 | 12/2004 | Willis et al. |
| 6,836,374 B2 | 12/2004 | Esch et al. |
| 6,860,601 B2 | 3/2005 | Shadduck |
| 6,878,320 B1 | 4/2005 | Alderson et al. |
| 6,884,261 B2 | 4/2005 | Zadno-Azizi et al. |
| 6,899,732 B2 | 5/2005 | Zadno-azizi et al. |
| 6,899,850 B2 | 5/2005 | Haywood et al. |
| 6,914,247 B2 | 7/2005 | Duggan et al. |
| 6,926,736 B2 | 8/2005 | Peng et al. |
| 6,935,743 B2 | 8/2005 | Shadduck |
| 6,949,093 B1 | 9/2005 | Peyman |
| 6,966,649 B2 | 11/2005 | Shadduck |
| 6,969,403 B2 | 11/2005 | Peng et al. |
| 7,001,374 B2 | 2/2006 | Peyman |
| 7,060,094 B2 | 6/2006 | Shahinpoor et al. |
| 7,068,439 B2 | 6/2006 | Esch et al. |
| 7,070,276 B2 | 7/2006 | Koretz |
| 7,074,227 B2 | 7/2006 | Portney |
| 7,122,053 B2 | 10/2006 | Esch |
| 7,144,423 B2 | 12/2006 | Mcdonald |
| 7,163,543 B2 | 1/2007 | Smedley et al. |
| 7,217,288 B2 | 5/2007 | Esch et al. |
| 7,241,312 B2 | 7/2007 | Lai et al. |
| 7,247,168 B2 | 7/2007 | Esch et al. |
| 7,261,737 B2 | 8/2007 | Esch et al. |
| 7,264,351 B2 | 9/2007 | Shadduck |
| 7,276,619 B2 | 10/2007 | Kunzler et al. |
| 7,278,739 B2 | 10/2007 | Shadduck |
| 7,311,194 B2 | 12/2007 | Jin et al. |
| 7,438,723 B2 | 10/2008 | Esch |
| 7,485,144 B2 | 2/2009 | Esch |
| 7,494,505 B2 | 2/2009 | Kappelhof et al. |
| 7,637,947 B2 | 12/2009 | Smith et al. |
| 7,763,069 B2 | 7/2010 | Brady et al. |
| 7,776,088 B2 | 8/2010 | Shadduck |
| 7,988,292 B2 | 8/2011 | Neal et al. |
| 8,048,155 B2 | 11/2011 | Shadduck |
| 8,158,712 B2 | 4/2012 | Your |
| 8,162,927 B2 | 4/2012 | Peyman |
| 8,303,656 B2 | 11/2012 | Shadduck |
| 8,314,927 B2 | 11/2012 | Choi et al. |
| 8,328,869 B2 | 12/2012 | Smiley et al. |
| 8,361,145 B2 | 1/2013 | Scholl et al. |
| 8,425,599 B2 | 4/2013 | Shadduck |
| 8,447,086 B2 | 5/2013 | Hildebrand et al. |
| 8,454,688 B2 | 6/2013 | Esch et al. |
| 8,668,734 B2 | 3/2014 | Hildebrand et al. |
| 8,900,298 B2 | 12/2014 | Anvar et al. |
| 8,956,408 B2 | 2/2015 | Smiley et al. |
| 8,968,396 B2 | 3/2015 | Matthews et al. |
| 8,992,609 B2 | 3/2015 | Shadduck |
| 9,044,317 B2 | 6/2015 | Hildebrand et al. |
| 9,277,987 B2 | 3/2016 | Smiley et al. |
| 9,456,895 B2 | 10/2016 | Shadduck |
| 9,693,858 B2 | 7/2017 | Hildebrand et al. |
| 9,795,503 B2 | 10/2017 | Perez et al. |
| 9,855,139 B2 | 1/2018 | Matthews et al. |
| 10,159,566 B2 | 12/2018 | Hadba et al. |
| 10,195,020 B2 | 2/2019 | Matthews |
| 10,299,913 B2 | 5/2019 | Smiley et al. |
| 10,350,060 B2 | 7/2019 | Smiley et al. |
| 10,433,949 B2 | 10/2019 | Smiley et al. |
| 10,433,950 B2 | 10/2019 | Shadduck |
| 10,534,113 B2 | 1/2020 | Shadduck |
| 10,595,989 B2 | 3/2020 | Hildebrand et al. |
| 11,471,272 B2 | 10/2022 | Smiley |
| 11,660,182 B2 | 5/2023 | Smiley et al. |
| 12,167,959 B2 | 12/2024 | Smiley et al. |
| 12,245,930 B2 | 3/2025 | Bor |
| 2001/0001836 A1 | 5/2001 | Cumming |
| 2001/0016771 A1 | 8/2001 | Cumming |
| 2001/0039449 A1 | 11/2001 | Johnson et al. |
| 2001/0051826 A1 | 12/2001 | Bogaert et al. |
| 2002/0016629 A1 | 2/2002 | Sandstedt et al. |
| 2002/0046783 A1 | 4/2002 | Johnson et al. |
| 2002/0055777 A1 | 5/2002 | Cumming et al. |
| 2002/0072795 A1 | 6/2002 | Green |
| 2002/0095212 A1 | 7/2002 | Boehm |
| 2002/0107568 A1 | 8/2002 | Zadno-Azizi et al. |
| 2002/0111678 A1 | 8/2002 | Zadno-Azizi et al. |
| 2002/0116057 A1 | 8/2002 | Ting et al. |
| 2002/0116058 A1 | 8/2002 | Zadno-Azizi et al. |
| 2002/0116059 A1 | 8/2002 | Zadno-Azizi et al. |
| 2002/0116060 A1 | 8/2002 | Nguyen et al. |
| 2002/0116061 A1 | 8/2002 | Zadno-Azizi et al. |
| 2002/0133228 A1 | 9/2002 | Sarver |
| 2002/0161434 A1 | 10/2002 | Laguette et al. |
| 2002/0161435 A1 | 10/2002 | Portney |
| 2002/0177896 A1 | 11/2002 | Israel |
| 2002/0188351 A1 | 12/2002 | Laguette |
| 2002/0193876 A1 | 12/2002 | Lang et al. |
| 2003/0003295 A1 | 1/2003 | Dreher et al. |
| 2003/0004569 A1 | 1/2003 | Haefliger |
| 2003/0018384 A1 | 1/2003 | Valyunin et al. |
| 2003/0042176 A1 | 3/2003 | Alderson et al. |
| 2003/0050695 A1 | 3/2003 | Lin et al. |
| 2003/0050696 A1 | 3/2003 | Cumming |
| 2003/0060878 A1 | 3/2003 | Shadduck |
| 2003/0060881 A1 | 3/2003 | Glick et al. |
| 2003/0078656 A1 | 4/2003 | Nguyen |
| 2003/0078657 A1 | 4/2003 | Zadno-Azizi et al. |
| 2003/0078658 A1 | 4/2003 | Zadno-Azizi |
| 2003/0083744 A1 | 5/2003 | Khoury |
| 2003/0109925 A1 | 6/2003 | Ghazizadeh et al. |
| 2003/0109926 A1 | 6/2003 | Portney |
| 2003/0130732 A1 | 7/2003 | Sarfarazi |
| 2003/0135272 A1 | 7/2003 | Brady et al. |
| 2003/0149480 A1 | 8/2003 | Shadduck |
| 2003/0158599 A1 | 8/2003 | Brady et al. |
| 2003/0171808 A1 | 9/2003 | Phillips |
| 2003/0183960 A1 | 10/2003 | Buazza et al. |
| 2003/0187505 A1 | 10/2003 | Liao |

(56) References Cited

U.S. PATENT DOCUMENTS

| | | |
|---|---|---|
| 2003/0199977 A1 | 10/2003 | Cumming |
| 2003/0234456 A1 | 12/2003 | Deryke et al. |
| 2003/0236376 A1 | 12/2003 | Kindt-larsen et al. |
| 2004/0001180 A1 | 1/2004 | Epstein |
| 2004/0006386 A1 | 1/2004 | Valint et al. |
| 2004/0006387 A1 | 1/2004 | Kelman |
| 2004/0008419 A1 | 1/2004 | Schachar |
| 2004/0015236 A1 | 1/2004 | Sarfarazi |
| 2004/0039446 A1 | 2/2004 | Mcnicholas |
| 2004/0054408 A1 | 3/2004 | Glick et al. |
| 2004/0059343 A1 | 3/2004 | Shearer et al. |
| 2004/0066489 A1 | 4/2004 | Benedikt et al. |
| 2004/0082993 A1 | 4/2004 | Woods |
| 2004/0082994 A1 | 4/2004 | Woods et al. |
| 2004/0085511 A1 | 5/2004 | Uno et al. |
| 2004/0085515 A1 | 5/2004 | Roffman et al. |
| 2004/0088050 A1 | 5/2004 | Norrby et al. |
| 2004/0111151 A1 | 6/2004 | Paul et al. |
| 2004/0111152 A1 | 6/2004 | Kelman |
| 2004/0111153 A1 | 6/2004 | Woods et al. |
| 2004/0127984 A1 | 7/2004 | Paul et al. |
| 2004/0162612 A1 | 8/2004 | Portney et al. |
| 2004/0169932 A1 | 9/2004 | Esch et al. |
| 2004/0181279 A1 | 9/2004 | Nun |
| 2004/0184158 A1 | 9/2004 | Shadduck |
| 2004/0190153 A1 | 9/2004 | Esch |
| 2004/0230203 A1 | 11/2004 | Yaguchi |
| 2005/0021139 A1 | 1/2005 | Shadduck |
| 2005/0090612 A1 | 4/2005 | Soane et al. |
| 2005/0113911 A1 | 5/2005 | Peyman |
| 2005/0119740 A1 | 6/2005 | Esch et al. |
| 2005/0125000 A1 | 6/2005 | Tourrette et al. |
| 2005/0131535 A1 | 6/2005 | Woods |
| 2005/0146685 A1 | 7/2005 | Hanaki et al. |
| 2005/0149183 A1 | 7/2005 | Shadduck |
| 2005/0165410 A1 | 7/2005 | Zadno-Azizi et al. |
| 2005/0251253 A1 | 11/2005 | Gross |
| 2005/0264756 A1 | 12/2005 | Esch |
| 2006/0021623 A1 | 2/2006 | Miller et al. |
| 2006/0041307 A1 | 2/2006 | Esch et al. |
| 2006/0061729 A1 | 3/2006 | Shadduck |
| 2006/0069433 A1 | 3/2006 | Nun |
| 2006/0084949 A1 | 4/2006 | Peyman |
| 2006/0158611 A1 | 7/2006 | Piers et al. |
| 2006/0246112 A1 | 11/2006 | Snyder et al. |
| 2006/0253196 A1 | 11/2006 | Woods |
| 2007/0010827 A1 | 1/2007 | Tu et al. |
| 2007/0010880 A1 | 1/2007 | Esch |
| 2007/0035049 A1 | 2/2007 | Bruce et al. |
| 2007/0088433 A1 | 4/2007 | Esch et al. |
| 2007/0100445 A1 | 5/2007 | Shadduck |
| 2007/0106377 A1 | 5/2007 | Smith et al. |
| 2007/0124919 A1 | 6/2007 | Probst |
| 2007/0156236 A1 | 7/2007 | Stenger |
| 2007/0162112 A1 | 7/2007 | Burriesci et al. |
| 2007/0203578 A1 | 8/2007 | Scholl et al. |
| 2007/0213817 A1 | 9/2007 | Esch et al. |
| 2007/0260308 A1 | 11/2007 | Tran |
| 2007/0299487 A1 | 12/2007 | Shadduck |
| 2008/0015689 A1 | 1/2008 | Esch et al. |
| 2008/0023137 A1 | 1/2008 | Jiang et al. |
| 2008/0046074 A1 | 2/2008 | Smith et al. |
| 2008/0046075 A1 | 2/2008 | Esch et al. |
| 2008/0195027 A1 | 8/2008 | Coroneo |
| 2008/0306587 A1 | 12/2008 | Your |
| 2009/0005865 A1 | 1/2009 | Smiley et al. |
| 2009/0030425 A1 | 1/2009 | Smiley et al. |
| 2009/0069786 A1 | 3/2009 | Vesely et al. |
| 2009/0079940 A1 | 3/2009 | Dai et al. |
| 2009/0149952 A1 | 6/2009 | Shadduck |
| 2009/0155371 A1 | 6/2009 | Sojka et al. |
| 2009/0312836 A1 | 12/2009 | Pinchuk et al. |
| 2010/0016965 A1 | 1/2010 | Hong et al. |
| 2010/0131058 A1 | 5/2010 | Shadduck |
| 2010/0179653 A1 | 7/2010 | Argento et al. |
| 2010/0228344 A1 | 9/2010 | Shadduck |
| 2010/0228346 A1 | 9/2010 | Esch |
| 2010/0324671 A1 | 12/2010 | Shadduck |
| 2010/0324672 A1 | 12/2010 | Esch et al. |
| 2011/0027766 A1* | 2/2011 | Yoo .......... A61B 3/032 434/262 |
| 2011/0052020 A1 | 3/2011 | Hildebrand et al. |
| 2011/0208301 A1 | 8/2011 | Anvar et al. |
| 2011/0282442 A1 | 11/2011 | Scholl et al. |
| 2011/0282443 A1 | 11/2011 | Smiley et al. |
| 2011/0288638 A1 | 11/2011 | Smiley et al. |
| 2012/0022547 A1 | 1/2012 | Hildebrand et al. |
| 2012/0078361 A1 | 3/2012 | Shadduck |
| 2012/0226351 A1 | 9/2012 | Peyman |
| 2012/0245591 A1 | 9/2012 | Matthews |
| 2013/0060331 A1 | 3/2013 | Shadduck |
| 2013/0103146 A1 | 4/2013 | Smiley et al. |
| 2013/0131794 A1 | 5/2013 | Smiley et al. |
| 2013/0176530 A1 | 7/2013 | Goodenough et al. |
| 2013/0250239 A1 | 9/2013 | Hildebrand et al. |
| 2013/0268070 A1 | 10/2013 | Esch et al. |
| 2014/0031737 A1 | 1/2014 | Silvestrini |
| 2014/0249625 A1 | 9/2014 | Shadduck |
| 2014/0293217 A1 | 10/2014 | Ogaya et al. |
| 2015/0057642 A1 | 2/2015 | Zickler et al. |
| 2015/0087743 A1 | 3/2015 | Anvar et al. |
| 2015/0202041 A1 | 7/2015 | Shadduck |
| 2015/0238310 A1 | 8/2015 | Matthews et al. |
| 2015/0238360 A1 | 8/2015 | De Juan et al. |
| 2015/0257874 A1 | 9/2015 | Hildebrand et al. |
| 2016/0038278 A1 | 2/2016 | Matthews |
| 2016/0184091 A1 | 6/2016 | Smiley et al. |
| 2016/0184092 A1 | 6/2016 | Smiley et al. |
| 2016/0262875 A1 | 9/2016 | Smith et al. |
| 2016/0263781 A1 | 9/2016 | Gerardi et al. |
| 2017/0020662 A1 | 1/2017 | Shadduck |
| 2017/0049561 A1 | 2/2017 | Smiley et al. |
| 2017/0079773 A1 | 3/2017 | Matthews et al. |
| 2017/0281334 A1 | 10/2017 | Zhao |
| 2017/0290658 A1 | 10/2017 | Hildebrand et al. |
| 2018/0085213 A1 | 3/2018 | Hadba et al. |
| 2018/0125640 A1 | 5/2018 | Smiley et al. |
| 2018/0132997 A1 | 5/2018 | Smiley et al. |
| 2018/0147051 A1 | 5/2018 | Scholl et al. |
| 2018/0153682 A1 | 6/2018 | Hajela et al. |
| 2018/0177589 A1 | 6/2018 | Argento et al. |
| 2018/0200112 A1 | 7/2018 | Krampert et al. |
| 2018/0256315 A1 | 9/2018 | Hildebrand et al. |
| 2019/0038401 A1 | 2/2019 | Reich et al. |
| 2019/0053892 A1 | 2/2019 | Siney et al. |
| 2019/0076243 A1 | 3/2019 | Hadba et al. |
| 2019/0361231 A1 | 11/2019 | Kurz |
| 2019/0366660 A1 | 12/2019 | Ge et al. |
| 2019/0374333 A1 | 12/2019 | Shadduck |
| 2020/0070453 A1 | 3/2020 | Piotrowski et al. |
| 2020/0315848 A1 | 10/2020 | Rosen |
| 2020/0332085 A1 | 10/2020 | Ebe et al. |
| 2020/0337833 A1 | 10/2020 | Green |
| 2020/0405541 A1 | 12/2020 | Raksi |
| 2021/0100649 A1 | 4/2021 | Walz et al. |
| 2021/0100650 A1 | 4/2021 | Smiley et al. |
| 2021/0186320 A1 | 6/2021 | Copland |
| 2022/0227082 A1 | 7/2022 | Körner et al. |
| 2022/0409363 A1 | 12/2022 | Smiley |
| 2023/0191730 A1 | 6/2023 | Walz et al. |
| 2023/0240836 A1 | 8/2023 | Irby et al. |
| 2023/0248509 A1 | 8/2023 | Smiley et al. |
| 2024/0148554 A1 | 5/2024 | Paliwal et al. |
| 2024/0325139 A1 | 10/2024 | Walz et al. |
| 2024/0325140 A1 | 10/2024 | Smiley et al. |
| 2025/0000642 A1 | 1/2025 | Bor |
| 2025/0057644 A1 | 2/2025 | Smiley et al. |

FOREIGN PATENT DOCUMENTS

| | | |
|---|---|---|
| CN | 1378440 | 11/2002 |
| CN | 1384727 | 12/2002 |
| CN | 104244867 | 11/2017 |
| EP | 0898972 | 3/1999 |

(56) References Cited

FOREIGN PATENT DOCUMENTS

| | | |
|---|---|---|
| FR | 2655841 | 6/1991 |
| FR | 2784575 | 12/2000 |
| JP | H05(1993)-171056 | 7/1993 |
| JP | 07-044938 | 5/1995 |
| JP | 08-501715 | 2/1996 |
| JP | 08-224295 | 9/1996 |
| JP | 09-294754 | 11/1997 |
| JP | 10-206609 | 8/1998 |
| JP | 11-047168 | 2/1999 |
| JP | 1999-047168 | 2/1999 |
| JP | 11-056998 | 3/1999 |
| JP | 11-169391 | 6/1999 |
| JP | 11-276509 | 10/1999 |
| JP | 11-332903 | 12/1999 |
| JP | 11-47168 | 9/2000 |
| JP | 2000-250203 | 9/2000 |
| JP | 2001-502592 | 2/2001 |
| JP | 2003-144387 | 5/2003 |
| JP | 2003-524503 | 8/2003 |
| JP | 2003-530978 | 10/2003 |
| JP | 2006-523130 | 10/2006 |
| JP | 2007-513715 | 5/2007 |
| JP | 2007-516794 | 6/2007 |
| JP | 2007-518447 | 7/2007 |
| JP | 2010-095719 | 4/2010 |
| JP | 2010-534520 | 11/2010 |
| JP | 2016-138050 | 8/2016 |
| JP | 2017-148614 | 8/2017 |
| JP | 2018-047096 | 3/2018 |
| RU | 1810052 | 4/1993 |
| WO | WO 1995/002378 | 1/1995 |
| WO | WO 1997/006751 | 2/1997 |
| WO | WO 2000/041650 | 7/2000 |
| WO | WO 2000/064655 | 11/2000 |
| WO | WO 2001/060286 | 8/2001 |
| WO | WO 2001/089435 | 11/2001 |
| WO | WO 2001/097742 | 12/2001 |
| WO | WO 2002/051338 | 7/2002 |
| WO | WO 2004/010895 | 2/2004 |
| WO | WO 2004/046768 | 6/2004 |
| WO | WO 2004/072689 | 8/2004 |
| WO | WO 2004/081613 | 9/2004 |
| WO | WO 2005/018504 | 3/2005 |
| WO | WO 2005/084588 | 9/2005 |
| WO | WO 2008/102582 | 8/2008 |
| WO | WO 2009/015234 | 1/2009 |
| WO | WO 2018/222558 | 12/2018 |
| WO | WO 2018/227014 | 12/2018 |
| WO | WO 2021/067574 | 4/2021 |
| WO | WO 2021/067579 | 4/2021 |
| WO | WO 2022/216451 | 10/2022 |
| WO | WO 2023/122490 | 6/2023 |
| WO | WO 2023/147224 | 8/2023 |
| WO | WO 2024/102536 | 5/2024 |
| WO | WO 2024/206250 | 10/2024 |
| WO | WO 2024/206251 | 10/2024 |
| WO | WO 2025/006182 | 1/2025 |

OTHER PUBLICATIONS

Baughman, "Avoiding the shrink," *Nature*, vol. 425, pp. 667, Oct. 16, 2003.
Conlisk, A. T. et al. "Mass Transfer and Flow in Electrically Charged Micro- and Nano-channels," *Analytical Chemistry*, vol. 74; iss. 9; pp. 2139-2150; May 2002.
Dubbelman et al. "The Thickness of the Aging Human Lens Obtained from Corrected Scheimpflug Images," *Optometry & Vision Science*; vo. 78; iss. 6; pp. 411-416; Jun. 2001.
Gorder, P. F.; Electricity can pump medicine in implanted medical devices; Ohio State Research News; 3 pgs.; May 2, 2002 (printed from internet Aug. 19, 2010).
Gordon, "Applications of shape memory polyurethanes," *Proceedings of the First Intl Conf. on Shape Memory and Superelastic Tech.*, Asilomar Conference Center, Pacific Grove, CA, USA, pp. 115-120, Mar. 1994.
Gruber et al. "Exhaustive soxhlet extraction for the complete removal of residual compounds," *Journal of Biomedical Materials Research*, vol. 53; No. 5; pp. 445-448; Mar. 2000.
Jeon et al., "Shape memory and nanostructure in poly(norbornyl-POSS) copolymers," *Polymer International*, vol. 49, pp. 453-457, May 2000.
Kim et al., "Polyurethanes having shape memory effects," *Polymer*, vol. 37, No. 26, pp. 5781-5793, Dec. 1996.
Lakes et al., "Dramatically stiffer elastic composite materials due to negative stiffness phase?," *Journal of the Mechanics and Physics of Solids*, vol. 50, pp. 979-1009, May 2002.
Lakes et al., "Extreme damping in composite materials with negative-stiffness inclusions," *Nature*, vol. 410, pp. 565-567, Mar. 29, 2001.
Lakes et al., "Microbuckling instability in elastomeric cellular sollids," *J. Materials Science*, vol. 28, pp. 4667-4672, Jan. 1993.
Lakes, "A broader view of membranes," *Nature*, vol. 414, pp. 503-504, Nov. 29, 2001.
Lakes, "Deformations in extreme matter," *Science*; perspectives; vol. 288; No. 5473; pp. 1976-1977; Jun. 16, 2000.
Lakes, "Extreme damping in compliant composites with a negative-stiffness phase," *Philosophical Magazine Letters*, vol. 81, No. 2, pp. 95-100, Feb. 2001.
Lakes, "Extreme damping in composite materials with a negative stiffness phase," *Physical Review Letters*, vol. 86, No. 13, pp. 2897-2900, Mar. 26, 2001.
Lakes, "Negative poisson's ratio materials," *Science*, vol. 238, pp. 551, Oct. 23, 1987.
Lakes, "No contractile obligations," *Nature*, vol. 358, pp. 713-714, Dec. 31, 1992.
Lendlein et al., "Biodegradable, elastic shape-memory polymers for potential biomedical applications", *Science*; vol. 296; pp. 1673-1676; May 31, 2002.
Lendlein et al., "Shape-memory polymers," *Angew. Chem. Int. Ed.*; vol. 41; pp. 2034-2057; Jun. 2002.
Li et al., "Crystallinity and morphology of segmented polyurethanes with different soft-segment length," *Journal of Applied Polymer Science*, vol. 62, pp. 631-638, Oct. 1996.
Liu et al., "Thermomechanical characterization of a tailored series of shape memory polymers," *Journal of Applied Medical Polymers*, vol. 6, No. 2, Dec. 2002.
Mather et al., "Strain recovery in POSS hybrid thermoplastics," *Polymer Preprints*, vol. 41, No. 1, pp. 528-529, Feb. 2000.
Metcalfe et al., "Cold hibernated elastic memory foams for endovascular interventions," Biomaterials, vol. 24, pp. 491-497, Feb. 2003.
Takahashi et al., "Structure and properties of shape-memory polyurethane block copolymers," *Journal of Applied Polymer Science*, vol. 60, pp. 1061-1069, May 1996.
Tehrani et al. "Capsule measuring ring to predict capsular bag diameter and follow its course after foldable intraocular lens implantation," *J Cataract Refract Surg.*; vol. 29; No. 11; pp. 2127-2134; Nov. 2003.
Tobushi et al., "Thermomechanical properties of shape memory polymers of polyurethane series and their applications," *Journal de Physique IV, Colloque C1*, vol. 6, pp. 377-384, Aug. 1996.
Vass et al. "Prediction of pseudophakic capsular bag diameter based on biometric variables," *J Cataract Refract Surg.*; vol. 25; pp. 1376-1381; Oct. 1999.
Wang et al., "Deformation of extreme viscoelastic metals and composites," *Materials Science and Engineerring A*, vol. 370, pp. 41-49, Apr. 15, 2004.
Wang et al., "Extreme stiffness systems due to negative stiffness elements," *American Journal of Physics*, vol. 72, No. 1, pp. 40-50, Jan. 2004.
Wyant et al.; "Basic Wavefront Aberration Theory for Optical Metrology," *Applied Optics and Optical Engineering*, vol. XI, pp. 1, 28-39, Aug. 10, 1992.
Xu et al., "Making negative poisson's ratio microstructures by soft lithography," *Advanced Materials*, vol. 11, No. 14, pp. 1186-1189, Jun. 1999.

(56) References Cited

OTHER PUBLICATIONS https://chem.libretexts.org/Bookshelves/Introductory_Chemistry/Chemistry_for_Allied Health_(Soult)/07%3A_Solids_Liquids_and_Gases/7.07%3A_Solubility, 2019.
https://web.archive.org/web/20211022014544/https://en.wikipedia.org/wiki/O-ring, Wikipedia's Article on O-ring, 2021.
Sun, M. et al. "Intraocular lens alignment from an en face optical coherence tomography image Purkinje-like method", *Optical Engineering, Society of Photo-Optical Instrumentation Engineers*, vol. 51, No. 6, pp. 061704-1 to 061704-9, Jun. 1, 2014.

\* cited by examiner

APPARATUS, SYSTEMS, AND METHODS FOR OBJECTIVELY ASSESSING ACCOMMODATION IN AN EYE

CROSS-REFERENCE TO RELATED APPLICATIONS

This application claims the benefit of U.S. Provisional Application No. 63/171,320 filed on Apr. 6, 2021 and U.S. Provisional Application No. 63/261,801 filed on Sep. 29, 2021, the contents of which are incorporated herein by reference in their entireties.

TECHNICAL FIELD

The present disclosure relates generally to the field of ophthalmic equipment, and, more specifically, to apparatus, systems, and methods for objectively assessing accommodation in an eye.

BACKGROUND

Accommodation refers to an increase in dioptric power of the eye when a subject attempts to focus on a near object or target. It is one third of the oculomotor near triad, the others being convergence and pupil constriction. Accommodative ability diminishes with increasing age with the onset of presbyopia or farsightedness caused by the loss of elasticity of the lens of the eye.

A subject's accommodative ability is traditionally measured in a clinical setting using subjective techniques such as standard push-up tests and questions directed to the patient. However, subjective tests are beset with both patient and clinician bias and often overestimate a patient's accommodative ability.

Moreover, while some academic or research institutions have proposed designs for systems that objectively measure accommodation, such systems are difficult to set up and the data obtained from such systems require a large amount of post-processing to obtain a useful result. As such, these systems are not intended for use in clinical settings where ease of use is paramount.

Furthermore, some systems for measuring accommodation rely on optically induced accommodative stimuli that are difficult for patients to focus on and may underestimate a patient's accommodative ability.

Therefore, a solution is needed which addresses the above challenges. Such a solution should provide an accurate and objective assessment of a subject's accommodative ability without being overly complicated. Such a solution should be designed with clinical considerations in mind and should also present the patient with a compelling real-world target that can sustain the patient's focus.

SUMMARY

Disclosed herein are apparatus, systems, and methods for objectively assessing accommodation in an eye. In one embodiment, a system for objectively assessing accommodation in an eye of a subject is disclosed. The system can comprise a near display, a first beam splitter, and a far display located further from the eye than the near display and the first beam splitter. The system can also comprise a controller in communication with the near display and the far display.

The near display can be oriented in a downward direction. The first beam splitter can be positioned at an oblique angle with respect to the near display such that graphics or images displayed on the near display are projected onto the near display.

The controller can comprise one or more processors and a tangible non-transitory machine-readable medium comprising instructions stored thereon. The one or more processors can execute at least some of the instructions to cause the controller to direct appearance of a stimulus target on the far display for a first duration and on the near display for a second duration. The near display can be configured to project the stimulus target onto the first beam splitter. The stimulus target displayed on the far display can be axially aligned with the stimulus target projected on the first beam splitter. The one or more processors can execute further instructions to cause the controller to obtain measurements concerning refractive states of the eye during the first duration and the second duration from a refractor device in communication with the controller and determine an accommodative response of the eye based in part on the refractive states.

The system can also comprise a support assembly and a motorized stage coupled to a top of the support assembly. The motorized stage can be configured to translate the near display and the first beam splitter in a linear direction. The first beam splitter can be automatically translated to a plurality stimulus positions located at variable distances from the eye of the subject. For example, the stimulus positions can be located at approximately 0.80 meters, 0.37 meters, 0.33 meters, and 0.25 meters from the eye of the subject. In certain embodiments, the far display can be located between approximately 4 meters and 6 meters from the eye of the subject.

In some embodiments, the stimulus target can be an optotype letter. The stimulus target can have a height dimension of between approximately 1.5 cm and 2.0 cm.

The system can further comprise an angled mirror and a hot mirror positioned above the angled mirror. The hot mirror can be positioned in between the near display assembly and the subject.

The refractor device can comprise a refractor light source configured to generate an illumination beam and a refractor camera configured to capture or detect light reflected by the eye in response to the illumination beam. The angled mirror and the hot mirror can be configured to steer the illumination beam to the eye of the subject. The light reflected by the eye can be steered back toward the refractor device via the hot mirror and the angled mirror. One or more processors of the refractor device can be configured to determine a refractive state of the eye based on the light reflected by the eye.

The system can further comprise a second beam splitter and an alignment camera in communication with the controller and configured to capture real-time images of the eye. The second beam splitter can be positioned in a line-of-sight of the eye at a distal end of the support assembly in between the near display assembly and the far display. The line-of-sight of the eye of the subject can extend through the hot mirror, the first beam splitter, and the second beam splitter such that the subject views the stimulus target displayed on the far display through the hot mirror, the first beam splitter, and the second beam splitter.

The alignment camera can be positioned offset from the line-of-sight of the eye. The second beam splitter can be configured to reflect images of the eye of the subject toward the alignment camera. A controller display, in communication with the controller, can be configured to display a graphical user interface (GUI) showing the real-time images of the eye captured by the alignment camera. The GUI can further show a fixed reticle graphic overlaid on the real-time images of the eye. The eye of the subject is optically aligned with the refractor device when the GUI shows an anatomical feature of the eye within at least part of the fixed reticle graphic.

The system can also comprise a far alignment light source positioned at the distal end of the support assembly. The far alignment light source can be configured to project a light marker onto the far display via the second beam splitter. The stimulus target can be displayed on the far display within a region encompassing the light marker.

The system can further comprise an input device configured to receive user inputs from the subject concerning the stimulus target displayed on at least one of the near display and the far display. The input device can be in communication with the controller. The one or more processors are configured to execute further instructions to cause the controller to direct the appearance of the stimulus target on the far display in a plurality of first rotational orientations for the first duration, receive user inputs from the input device corresponding to the first rotational orientations, direct the appearance of the stimulus target on the near display in a plurality of second rotational orientations for the second duration, and receive user inputs from the input device corresponding to the second rotational orientations.

In some embodiments, the input device can be a joystick. In these embodiments, each of the user inputs is a joystick movement initiated by the subject in a direction associated with a rotational orientation of the stimulus target displayed on either the near display or the far display.

The one or more processors of the controller can be configured to execute further instructions to cause the controller to obtain measurements concerning a pupil diameter and a gaze displacement of the eye from the refractor device. The controller can determine the accommodative response of the eye only when the pupil diameter exceeds a minimum diameter threshold and the gaze displacement is less than a maximum displacement threshold.

The one or more processors of the controller can also be configured to execute further instructions to cause the controller to obtain refraction data concerning the eye of the subject during a calibration procedure from the refractor device. The calibration procedure can comprise placing an infrared filter in front of the eye, placing each of a plurality of trial lenses of different diopter strengths in front of the eye in sequence, and directing the subject to look at the far display and concurrently measuring the refractive state of the eye for each of the trial lenses using the refractor device. The controller can then fit a line to datapoints of the different diopter strengths of the trial lenses plotted against averages of the refractive states measured using a regression technique and calculate a slope of the line to be used as a calibration factor.

The one or more processors of the controller can be configured to execute further instructions to cause the controller to calculate the accommodative response of the eye using the following formula:

$$\text{Accommodative Response} = CF^*(X_F - X_N)$$

In the formula above, CF is the calibration factor, $X_F$ is a mean far refraction value calculated using measurements made during the first duration when the stimulus target is displayed on the far display, and $X_N$ is a mean near refraction value calculated using measurements made during the second duration when the stimulus target is displayed on the near display.

Also disclosed is a method for objectively assessing accommodation in an eye of a subject. In one embodiment, the method can comprise displaying, at a far display, a stimulus target for a first duration and displaying, at a near display, the stimulus target for a second duration.

In some embodiments, the stimulus target displayed at the near display can be projected onto a first beam splitter positioned at an oblique angle with respect to the near display. In these and other embodiments, the stimulus target displayed on the far display can be axially aligned with the stimulus target projected on the first beam splitter.

The method can also comprise obtaining, at a controller, measurements concerning refractive states of the eye during the first duration and the second duration from a refractor device in communication with the controller. The method can further comprise determining, using the controller, an accommodative response of the eye based in part on the respective refractive states.

In another embodiment, the method can comprise displaying, at the far display, the stimulus target in a plurality of first rotational orientations for the first duration and displaying, at the near display the stimulus target in a plurality of second rotational orientations for the second duration. In this embodiment, the method can also comprise receiving, at the controller, a number of user inputs applied to an input device by the subject. The input device (e.g., a joystick) can be in communication with the controller. The user inputs (e.g., joystick movements) can correspond to the first rotational orientations and the second rotational orientations. The method can further comprise obtaining, at the controller, measurements concerning refractive states of the eye during the first duration and the second duration from the refractor device. The method can also comprise determining, using the controller, an accommodative response of the eye based in part on the respective refractive states and the user inputs.

In some embodiments, the method can comprise translating the near display and the first beam splitter to a stimulus position via a motorized stage prior to displaying the stimulus target.

The method can comprise generating, using a refractor light source of the refractor device, an illumination beam and capturing or detecting, using a refractor camera of the refractor device, light reflected by the eye in response to the illumination beam. In some embodiments, the illumination beam can be steered by an angled mirror and a hot mirror positioned above the angled mirror to the eye of the subject. The light reflected by the eye can be steered back toward the refractor device via the hot mirror and the angled mirror. One or more processors of the refractor device can determine a refractive state of the eye based on the light reflected by the eye.

The method can also comprise capturing real-time images of the eye using an alignment camera positioned offset from a line-of-sight of the eye. The images of the eye can be reflected by a second beam splitter positioned in the line-of-sight of the eye toward the alignment camera. The method can also comprise displaying, using a controller display in communication with the controller, a graphical user interface (GUI) showing the real-time images of the eye captured by the alignment camera. The GUI can further show a fixed reticle graphic overlaid on the real-time images of the eye. The method can further comprise aligning the eye with the refractor device by adjusting at least one of a chinrest assembly and a position of a head of the subject until the GUI shows an anatomical feature of the eye within at least part of the fixed reticle graphic.

The method can further comprise obtaining, from the refractor device, measurements concerning a pupil diameter and a gaze displacement of the eye and proceeding to determine the accommodative response of the eye only when the pupil diameter exceeds a minimum diameter threshold and the gaze displacement is less than a maximum displacement threshold.

The method can also comprise calibrating the instruments to the eye of the subject by placing an infrared filter in front of the eye, placing each of a plurality of trial lenses of different diopter strengths in front of the eye in sequence, and directing the subject to look at the far display and concurrently measuring the refractive state of the eye for each of the trial lenses using the refractor device. The controller can then fit a line to datapoints of the different diopter strengths of the trial lenses plotted against averages of the refractive states measured using a regression technique and calculate a slope of the line to be used as a calibration factor.

The method can further comprise calculating a mean far refraction value using measurements made during the first duration when the stimulus target is displayed on the far display and calculating a mean near refraction value calculated using measurements made during the second duration when the stimulus target is displayed on the near display. The accommodative response of the eye of the subject can then be calculated by subtracting the mean near refraction value from the mean far refraction value and multiplying the result by the calibration factor.

DETAILED DESCRIPTION

Figure 1:
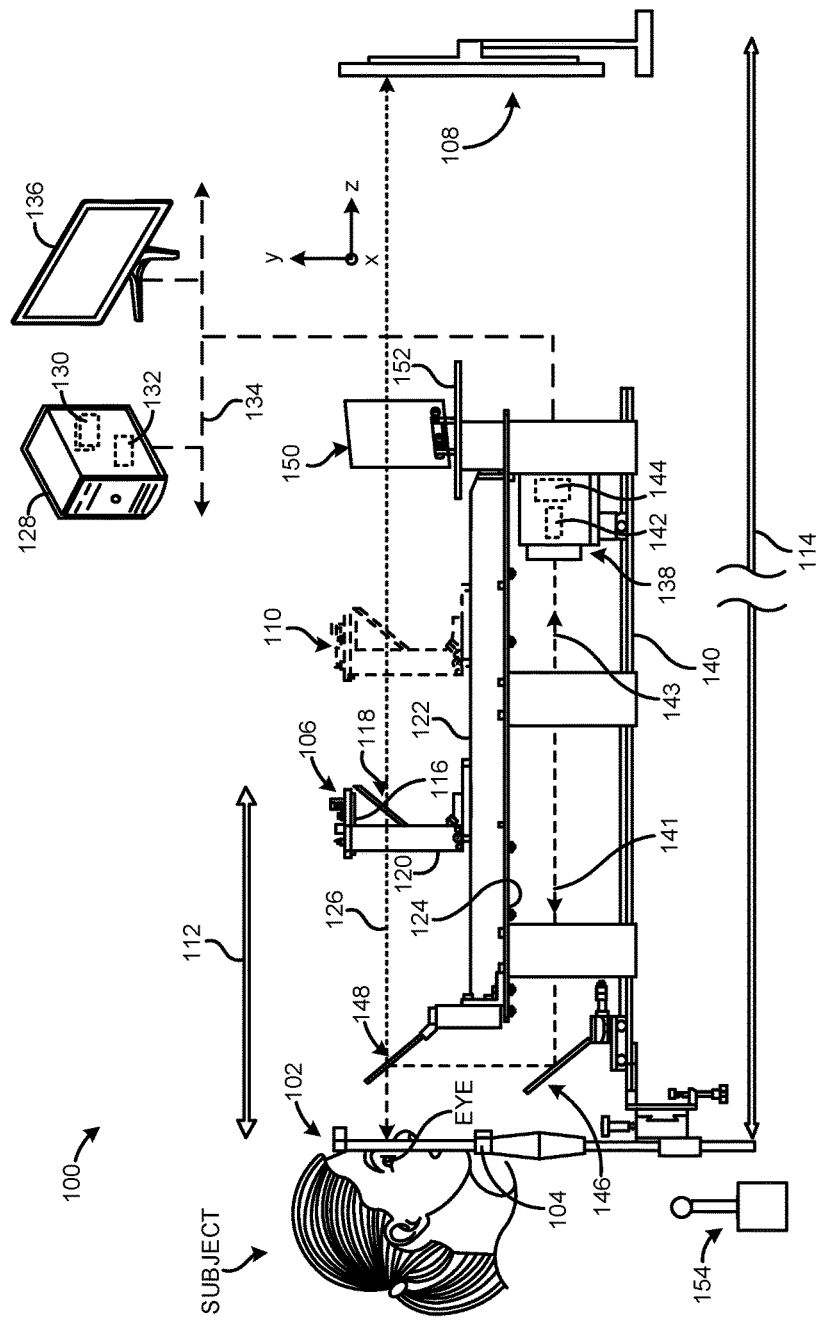
FIG. 1 schematically illustrates one embodiment of a system for objectively assessing accommodation in an eye.
Figure 2:
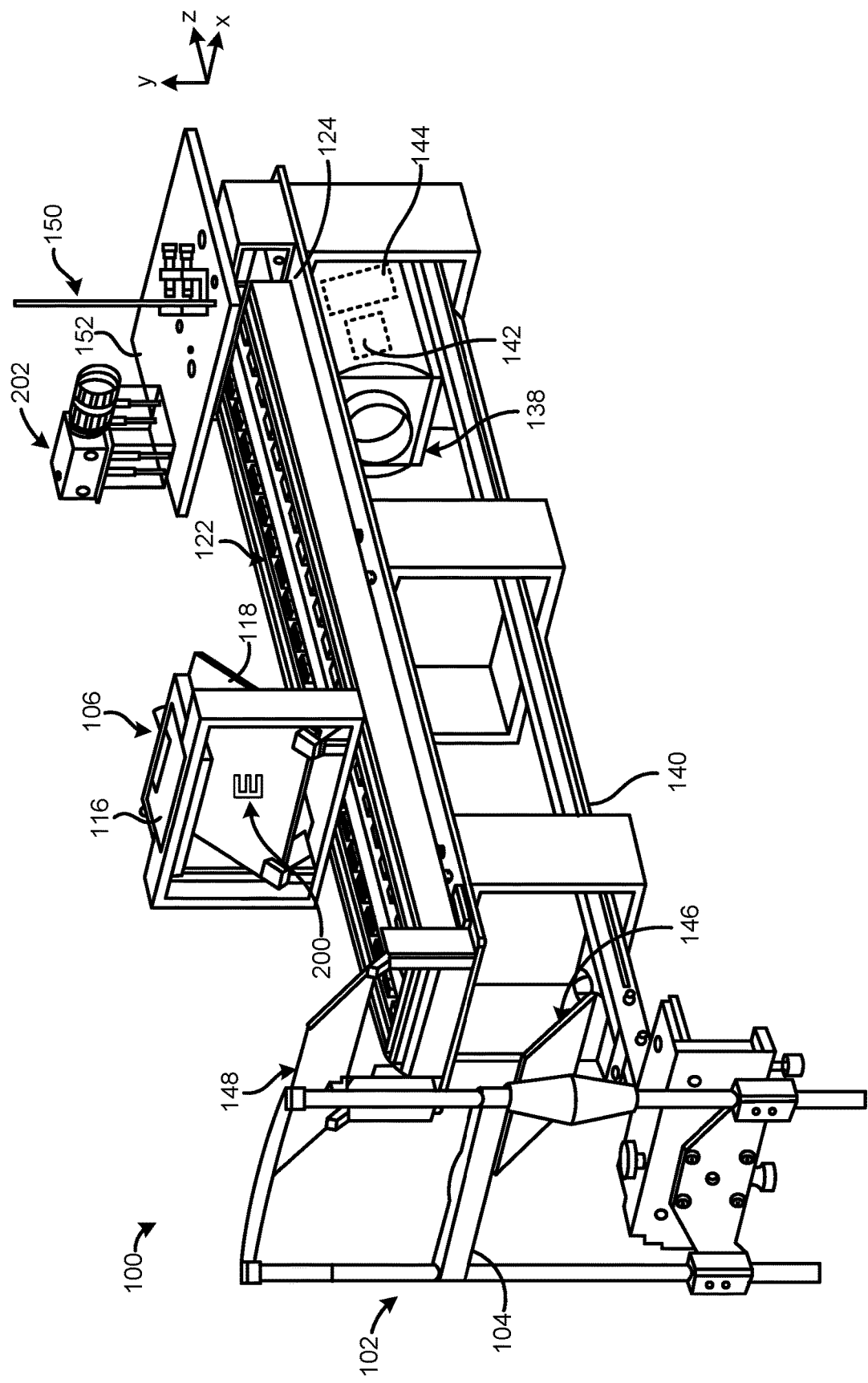
FIG. 2 illustrates a perspective view of a portion of the system shown in FIG. 1.

FIG. 1 schematically illustrates one embodiment of a system 100 for objectively assessing accommodation in an eye of a subject. The system 100 can measure real-time changes in a refractive state of the eye as the subject views real-world stimulus targets binocularly in free space. FIG. 2 is a perspective view of a portion of the system 100 shown in FIG. 1.

The system 100 can be used to evaluate visual accommodation in a number of conditions. In some embodiments, the system 100 can be used to determine the efficacy of an implanted accommodating intraocular lens (AIOL). For example, the system 100 disclosed herein can be used to determine the efficacy of any of the AIOLs disclosed in the following U.S. patent applications and publications: U.S. patent application Ser. No. 17/060,901 filed on Oct. 1, 2020 and U.S. patent application Ser. No. 17/060,919 filed on Oct. 1, 2020; U.S. Pat. Pub. No. 2020/0337833; U.S. Pat. Pub. No. 2018/0256315; U.S. Pat. Pub. No. 2018/0153682; and U.S. Pat. Pub. No. 2017/0049561 and in the following issued U.S. Pat. Nos. 10,299,913; 10,195,020; and 8,968,396, the contents of which are incorporated herein by reference in their entireties.

In other embodiments, the system 100 can be used to assess the efficacy of pseudophakic intraocular lenses or phakic intraocular lens. In further embodiments, the system 100 can be used to assess visual accommodation of a natural crystalline lens of a subject.

As shown in FIGS. 1 and 2, the system 100 can comprise a chinrest assembly 102 further comprising a chinrest 104 for supporting a chin of the subject. The chinrest 104 can support the chin of the subject when the subject is seated in a chair or seat (not shown).

The chinrest assembly 102 can be adjusted with the subject's chin resting on the chinrest 104. The chinrest assembly 102 can be adjusted to align the eye of the subject with certain components of the system 100.

For example, the chinrest 104 can be raised or lowered in a vertical direction or moved laterally. Alignment of the eye of the subject will be discussed in more detail in later sections.

The system 100 can also comprise a near display assembly 106 and a far display 108 located further from the eye than the near display assembly 106. The near display assembly 106 can be automatically translated to a plurality of stimulus positions 110 located at variable distances 112 from the eye. The far display 108 can be located at a far distance 114 from the eye. The far distance 114 can be greater than any of the variable distances 112. In some embodiments, the far distance 114 can be between about 4.0 meters and 6.0 meters (e.g., 4, meters, 4.5 meters 5.0 meters, 5.5 meters, or 6.0 meters). The variable distances 112 can be located at approximately 0.80 meters, 0.37 meters, 0.33 meters, and 0.25 meters from the eye of the subject.

The near display assembly 106 can comprise a near display 116 and a first beam splitter 118 carried or otherwise supported by a near display frame 120. The first beam splitter 118 can be a dichroic filter or be made in part of a dichroic material.

Figure 4:
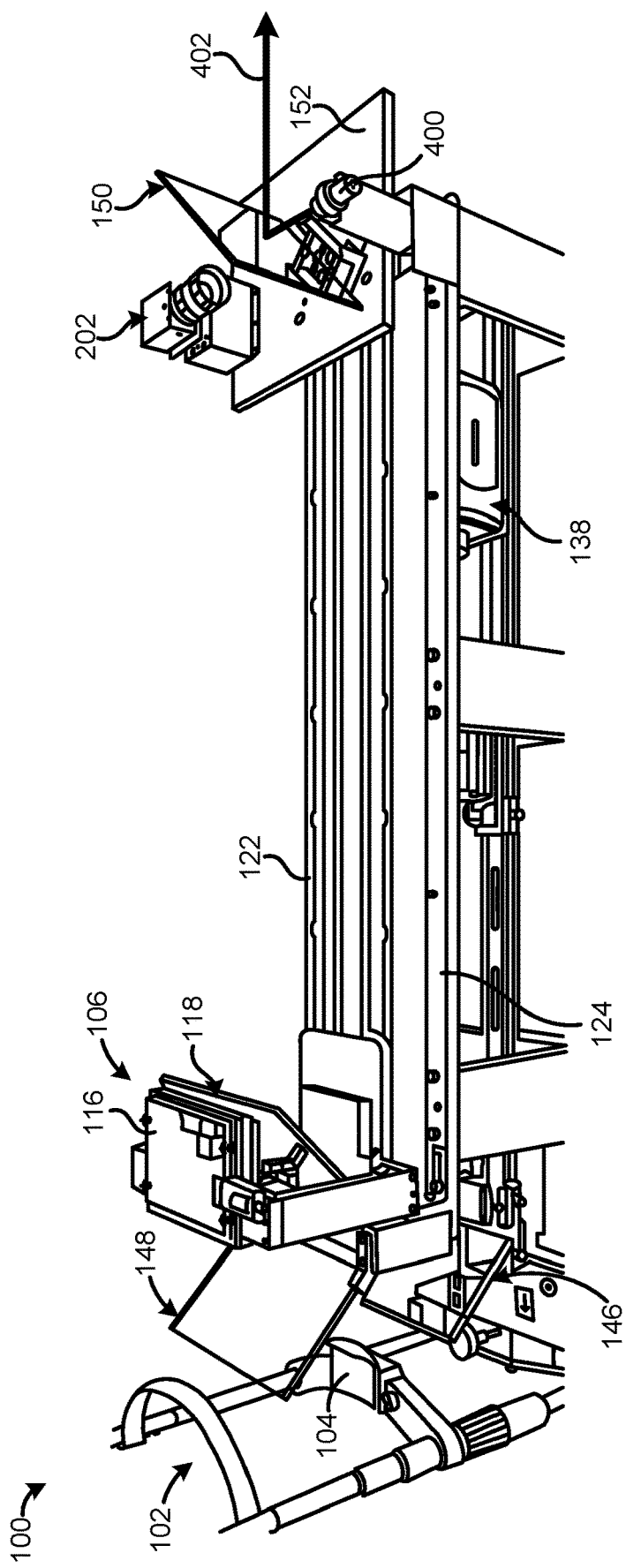
FIG. 4 illustrates a top down perspective view of one embodiment of a portion of the system showing a far alignment light source.

In some embodiments, the beam splitters disclosed herein (including any of the first beam splitter 118 or the second beam splitter 150, see also, FIG. 4) can be made of tourmaline. Tourmaline is a crystalline boron silicate mineral also comprising aluminum, iron, magnesium, lithium, potassium, and/or sodium. In other embodiments, any of the first beam splitter 118 or the second beam splitter 150 can be a plate-type beam splitter made by coating a mirror or a fused silica substrate shaped as a plate with a dichroic optical coating or a metallic coating.

As shown in FIGS. 1 and 2, the first beam splitter 118 can be positioned at an oblique angle (i.e., a non-right angle) with respect to the near display 116. For example, the first beam splitter 118 can be positioned with respect to the near display 116 at a 45 degree angle when the beam splitter is designed to have an angle of incidence of 45 degrees.

In some embodiments, the first beam splitter 118 can be mounted to one or more frame sides of the near display frame 120. The first beam splitter 118 can be coupled to the near display frame 120 via a rotatable hinge such that an angle of the first beam splitter 118 is adjustable.

The near display 116 can display and project an image or graphic onto the first beam splitter 118 for viewing by the subject. Moreover, as shown in FIGS. 1 and 2, the near display 116 can be oriented in a vertically downward direction or facedown such that the near display 116 faces a base of the near display frame 120.

A motorized stage 122 can be positioned along a top of a support assembly 124. In some embodiments, the support assembly 124 can be an elongate table or bench. The motorized stage 122 can translate the near display frame 120 carrying the near display 116 and the first beam splitter 118 in a linear direction. In some embodiments, the motorized stage 122 can be controlled by one or more servo controllers or motors (e.g., brushless servo controllers). In other embodiments, the motorized stage 122 can be controlled or otherwise operated by another type of actuator such as a linear actuator, a rotary actuator, or a stepper motor.

The first beam splitter 118 can be translated along a line-of-sight 126 of the eye of the subject to the plurality of stimulus positions 110 (one such position is shown in phantom lines in FIG. 1). The stimulus positions 110 can be located at any distance between 0.25 meters and 1.0 meters from the eye of the subject. More specifically, the stimulus positions 110 can be located at approximately 0.80 meters, 0.37 meters, 0.33 meters, and 0.25 meters from the eye of the subject. These can correspond to diopter distances of 1.25 Diopters, 2.7 Diopters, 3.0 Diopters, and 4.0 Diopters, respectively. In other embodiments, the stimulus positions 110 can also be located at approximately 0.66 meters, 0.57 meters, 0.50 meters, and 0.29 meters from the eye of the subject (corresponding to diopter distances of 1.50 Diopters, 1.75 Diopters, 2.0 Diopters, and 3.5 Diopters, respectively).

The system 100 can comprise a controller 128 having one or more processors 130 and at least one memory 132. The one or more processors 130 can include one or more central processing units (CPUs), graphical processing units (GPUs), Application-Specific Integrated Circuits (ASICs), field-programmable gate arrays (FPGAs), or a combination thereof.

The memory 132 can be a tangible non-transitory machine-readable medium comprising instructions (e.g., software instructions) stored thereon. For example, the memory 132 can refer to a non-volatile memory, a volatile memory, or other types of computer-readable storage. More specifically, the memory 132 can refer to flash memory (in the form of a solid-state drive), dynamic random access memory (DRAM), synchronous dynamic random access memory (SDRAM) such as low-power double data rate (LPDDR) SDRAM, embedded multi-media controller (eMMC) storage, or a combination thereof. The one or more processors 130 can execute the machine-readable instructions stored on the memory 132 to control certain electronic components of the system 100.

The controller 128 can communicate with the other electronic components via one or more networks 134. In some embodiments, the networks 134 can be or refer to networks established using physical or wired connections such as bi-directional high-speed buses (e.g., a serial communication bus), fiber optic cables, Ethernet, or a combination thereof. For example, the network 134 can refer to part of a local area network (LAN) such as a Controller Area Network (CAN) or a Controller Area Network with Flexible Data Rate (CAN-FD). In other embodiments, the networks 134 can be or refer to networks established using a wireless communication protocol or standard such as a 3G wireless communication standard, a 4G wireless communication standard, a 5G wireless communication standard, a long-term evolution (LTE) wireless communication standard, a Bluetooth™ (IEEE 802.15.1) or Bluetooth™ Lower Energy (BLE) short-range communication protocol, a wireless fidelity (WiFi) (IEEE 802.11) communication protocol, an ultra-wideband (UWB) (IEEE 802.15.3) communication protocol, a ZigBee™ (IEEE 802.15.4) communication protocol, or a combination thereof.

The controller 128 can be in communication with or communicatively coupled to a controller display 136. In some embodiments, the controller 128 can be a dedicated desktop computer, a laptop computer, or a tablet computer and the controller display 136 can be a display of the desktop computer, laptop computer, or tablet computer, respectively. In other embodiments, the controller display 136 can be a separate display. For example, the controller display 136 can be a high-definition television, an ultra-high definition television, a projector, or a computer display. Although not shown in the figures, the controller 128 can also be in communication with a data management module or a cloud storage database for managing patient data or test data.

The controller 128 can be in communication with or communicatively coupled to the near display 116 and the far display 108. The one or more processors 130 of the controller 128 can execute instructions stored in the memory 132 to cause the controller 128 to direct appearance of a stimulus target 200 on the far display 108 and the near display 116 (see, e.g., FIGS. 2, 3B, 3C, and 5B).

In some embodiments, the far display 108 and the near display 116 can be electronic flat-panel displays. For example, the far display 108 and the near display 116 can be high-resolution liquid-crystal displays. For example, at least one of the far display 108 and the near display 116 can have a display resolution of 1280×1080. In other embodiments, at least one of the far display 108 and the near display 116 can have a display resolution of 1920×1080.

In other embodiments, at least one of the far display 108 and the near display 116 can be a light-emitting diode (LED) display, an organic light-emitting diode (OLED) display, or an active-matrix OLED (AMOLED) display.

In some embodiments, the stimulus target 200 can be a digitally or electronically rendered graphic, icon, or letter displayed on the far display 108 or the near display 116. In some embodiments, the stimulus target 200 can be a digitally or electronically rendered optotype letter used to assess a subject's visual acuity. For example, the stimulus target 200 can be a digitally or electronically rendered letter "E" or another optotype letter having spaced-apart lines or patterns (e.g., the letter "F"). In other embodiments, the stimulus target 200 can be any asymmetric graphic, icon, or letter.

The stimulus target 200 can have a height dimension of between approximately 1.50 cm and 2.0 cm. For example, the stimulus target 200 can have a height dimension of approximately 1.75 cm.

Since the stimulus target 200 is electronically generated on the far display 108 and the near display 116, the size of the stimulus target 200 can be adjusted as the stimulus target 200 is brought closer to the eye of the subject. In some embodiments, the size of the stimulus target 200 can be reduced as the stimulus target 200 is displayed on the near display 116. In other embodiments, the size of the stimulus target 200 can be increased or enlarged as the stimulus target 200 is displayed on the far display 108.

In some embodiments, the stimulus target 200 can be a high-contrast letter, graphic, or icon. For example, the stimulus target 200 can be a light-colored graphic, icon, or letter (e.g., a white-colored letter "E") displayed on a dark-colored background (e.g., a black-colored background). The contrast between the stimulus target 200 and the background should be great enough to allow the subject to make out one or more edges of the stimulus target 200.

In some embodiments, the pixel intensity of the dark-colored background can be set at 0 and the pixel intensity of the stimulus target 200 (e.g., the digitally-rendered letter "E") can be set at 255.

In other embodiments, the stimulus target 200 can be a dark-colored graphic, icon, or letter (e.g., a dark-colored letter) displayed on a light-colored background. In additional embodiments, the color of the stimulus target 200 can vary as the stimulus target 200 appears on different displays.

The near display 116 can be configured to project the stimulus target 200 onto the first beam splitter 118 below. The first beam splitter 118 can reflect the image of the stimulus target 200 onto the eye of the subject. When the stimulus target 200 is displayed on the far display 108 (and the near display 116 is not displaying the stimulus target 200), the subject can view the stimulus target 200 displayed on the far display 108 through the first beam splitter 118.

The stimulus target 200 displayed on the far display 108 can be axially aligned with the stimulus target 200 projected on the first beam splitter 118. For example, the stimulus target 200 displayed on the far display 108 and the first beam splitter 118 can both be axially aligned with a line-of-sight 126 of the eye of the subject. As will be discussed in more detail in later sections, the eye of the subject can also be aligned with one or more optical components or cameras/detectors of the system 100.

One technical advantage of the system 100 disclosed herein is that display and movement of the stimulus targets 200 are automated and controlled by the controller 128. A clinician or technician can perform the accommodation assessment by simply clicking on buttons rendered as part of graphical user interfaces rendered on the controller display 136. The system 100 automatically presents real-world stimulus targets 200 to the subject for viewing without the clinician or technician having to physically move such targets or ask the subject to change their position. Moreover, the stimulus targets 200 are translated in a manner that is repeatable such that subsequent assessments can be performed and their results compared against earlier assessments.

FIGS. 1 and 2 also illustrate that the system 100 can comprise a refractor device 138 coupled to a rail 140 positioned at a base of the support assembly 124. The refractor device 138 can determine a refractive state of the eye of the subject as stimulus targets 200 are shown to the subject via the far display 108 and the first beam splitter 118.

In some embodiments, the refractor device 138 can be a photorefractor such as an infrared (IR) photorefractor. For example, the refractor device 138 can be the PlusOptix® PowerRef 3 photorefractor from PlusOptix GmbH.

In other embodiments, the refractor device 138 can be an autorefactor. For example, the refractor device 138 can be the Grand Seiko WR-5100K autorefractor from Shigiya Machinery Works Ltd.

The refractor device 138 can measure the refractive state of the eye using eccentric photorefraction. For example, the refractor device 138 can generate and direct an illumination beam 141 (e.g., an IR or near infrared (NIR) beam at approximately 880 nm±80 nm) toward the eye of the subject using a refractor light source 142. Since infrared light is invisible to the human eye, there is no effect on patient comfort, pupil diameter, or accommodation response.

The fundus of the eye can reflect back the illumination beam 141 (e.g., the IR or NIR beam) as reflected light 143 (e.g., reflected IR or NIR light) emerging from the pupil of the eye. The reflected light 143 can be captured by a refractor camera 144 (e.g., infrared camera or detector).

In some embodiments, the refractor device 138 can determine the refractive state of the eye based on the extent of crescents observed along the pupil of the eye. Larger crescent sizes can indicate that the eye of the subject has a greater defocus.

The refractor device 138 can record images of the reflected light 143 at a capture rate of 50 Hz or once every 20 milliseconds (ms). The recorded images can be used by the refractor device 138 to determine the refractive state of the eye.

The system 100 can also comprise an angled mirror 146 and a hot mirror 148 configured to direct the illumination beam 141 to the eye and direct the reflected light 143 back to the refractor device 138. FIGS. 1 and 2 illustrate that the refractor device 138 can be positioned out of the subject's line-of-sight 126. For example, the refractor device 138 can be positioned vertically below the chinrest 104, the motorized stage 122, and the near display assembly 106 (i.e., vertically below in the Y-direction). As shown in FIG. 1, at least part of the beam path of the illumination beam 141 can be parallel to but vertically offset from the line-of-sight 126 of the eye of the subject (i.e., vertically offset in the Y-direction). The angled mirror 146 and the hot mirror 148 can work in concert to steer the illumination beam 141 to the eye of the subject. Moreover, the same hot mirror 148 and angled mirror 146 can be used to steer the reflected light 143 back to the refractor device 138. At least part of the light path of the reflected light 143 can also be parallel to but vertically offset from the line-of-sight 126 of the eye of the subject.

The reflective surface of the angled mirror 146 can be positioned at an angle with respect to the beam path of the illumination beam 141. For example, the reflective surface of the angled mirror 146 can be positioned at a 45 degree angle with respect to the beam path of the illumination beam 141. The hot mirror 148 can be positioned at an angle with respect to the beam path reflected from the angled mirror 146 and the line-of-sight 126 of the eye. For example, the hot mirror 148 can be positioned at a 45 degree angle with respect to the beam path reflected from the angled mirror 146 and the line-of-sight 126 of the eye.

The angled mirror 146 can be positioned at a proximal end of the rail 140. The angled mirror 146 can be configured to reflect the illumination beam 141 originating from the refractor light source 142 (e.g., from an IR or NIR light source of the refractor device 138) to the hot mirror 148.

The hot mirror 148 can be positioned at or past a proximal end of the motorized stage 122. The hot mirror 148 can be positioned in between the near display assembly 106 and the subject. The hot mirror 148 can be positioned vertically above the angled mirror 146 (vertically above in the Y-direction as shown in FIG. 1). The hot mirror 148 can be configured to selectively reflect the illumination beam toward the eye of the subject.

The hot mirror 148 can also be configured to reflect images of the illuminated eye or the IR/NIR light emerging from the pupil of the eye toward the angled mirror 146. In some embodiments, the hot mirror 148 can be a dichroic filter or be made in part of a dichroic material.

The angled mirror 146 can be configured to reflect the images of the illuminated eye or the IR/NIR light emerging from the pupil of the eye back toward the refractor camera 144 (e.g., an infrared camera or detector within the photo-refractor).

One technical problem faced by the applicants is how to position or align the refractor device 138 with the eye of the subject without the refractor device 138 obstructing the subject's line-of-sight 126 and/or distracting the subject while the subject is trying to focus on the stimulus target 200. One solution discovered and developed by the applicants is the set up disclosed herein where the refractor device 138 is positioned vertically below the line-of-sight 126 of the subject (see, e.g., FIGS. 1 and 2) and both the angled mirror 146 and the hot mirror 148 are used to optically align the refractor device 138 with the measured eye of the subject. The subject can view the stimulus targets 200 through the hot mirror 148.

The system 100 can determine an accommodative response of the eye based on the refractive state of the eye measured by the refractor device 138. More specifically, the system 100 can measure real-time changes in the refractive state of the eye when the subject is shown the stimulus target 200 at different distances from the eye. For example, the controller 128 can be programmed to direct appearance of the stimulus target 200 on the far display 108 for a first duration and then on the near display 116 for a second duration. The stimulus target 200 displayed on the near display 116 can be projected onto the first beam splitter 118 for viewing by the subject.

In some embodiments, the first duration and the second duration can be time periods lasting between approximately 5 seconds and 15 seconds (e.g., 10 seconds). In other embodiments, at least one of the first duration and the second duration can be less than 5 seconds or greater than 15 seconds.

The refractor device 138 can determine the refractive states of the eye as the subject focuses or attempts to focus on the stimulus target 200 during the first duration and the second duration. The refractor device 138 can transmit the refractive states measured to the controller 128.

The controller 128 can then determine the accommodative response of the eye based in part on these refractive states. As will be discussed in more detail in later sections, the controller 128 can first scale or adjust the refractive states using a calibration factor 908 (see, e.g., FIG. 9). The controller 128 can also calculate a first mean refractive state using the refractive states measured during the first duration and a second mean refractive state using the refractive states measured during the second duration. Finally, the controller 128 can determine the accommodative response using the first mean refractive state and the second mean refractive state.

FIG. 2 illustrates that the system 100 can also comprise a second beam splitter 150 (see also FIG. 4) positioned in the line-of-sight 126 of the measured eye in between the near display assembly 106 and the far display 108. The second beam splitter 150 can be fastened or otherwise coupled to a raised platform 152 positioned at a distal end of the support assembly 124.

For example, the raised platform 152 can be a flat surface positioned at the top of a pillar serving as one of the legs of the support assembly 124. In other embodiments, the raised platform 152 can be a separate structure from the support assembly 124.

The system 100 can also comprise an alignment camera 202 fastened or otherwise coupled to the raised platform 152. The alignment camera 202 can be positioned laterally offset from the line-of-sight 126 of the eye (for example, offset in the X-direction as shown in FIG. 2). For example, a camera lens of the alignment camera 202 can be positioned substantially perpendicular to the line-of-sight 126 of the eye.

When the subject is properly positioned at the chinrest assembly 102, the second beam splitter 150 can reflect images of the eye of the subject toward the alignment camera 202. The second beam splitter 150 can be positioned at an angle (e.g., an approximately 45 degree angle) with respect to the line-of-sight 126 of the eye. This can allow the second beam splitter 150 to reflect images of the eye to the alignment camera 202 while allowing the subject to view the stimulus target 200 on the far display 108.

The alignment camera 202 can be configured to capture real-time images 806 (see, e.g., FIGS. 8, 9, and 10) of the eye. An operator can use the images captured by the alignment camera 202 to determine whether the eye is properly aligned (i.e., optically aligned) with the various components of the system 100. For example, an operator can use the images captured by the alignment camera 202 to determine if the eye is properly aligned with the refractor device 138.

One technical problem faced by the applicants is how to capture images of the eye of the subject during the accommodation procedure without the camera obstructing the subject's line-of-sight 126 and/or distracting the subject while the subject is trying to focus on the stimulus target 200. One solution discovered and developed by the applicants is the alignment camera 202 disclosed herein (see, e.g., FIGS. 2 and 3) which is positioned substantially perpendicular to and laterally offset from the line-of-sight 126 (see, e.g., FIG. 1) of the subject. The alignment camera 202 utilizes the second beam splitter 150, positioned at an angle with respect to the alignment camera 202 and the line-of-sight 126 of the subject, to reflect images of the eye of the subject to the alignment camera 202. The subject can view the stimulus target 200 displayed on the far display 108 through the second beam splitter 150.

The alignment camera 202 can also be configured to transmit the real-time images 806 of the eye to the controller 128. The alignment camera 202 can be in communication with or communicatively coupled to the controller 128.

As previously discussed, a controller display 136 can be in communication with or communicatively coupled to the controller 128. The controller 128 can generate one or more graphical user interfaces (GUIs) (e.g., an alignment GUI 800 (see FIG. 8), a calibration GUI 900 (see FIG. 9), or an accommodation GUI 1000 (see FIG. 10)) to be displayed on the controller display 136. The GUIs can show the real-time images 806 of the eye captured by the alignment camera 202. As will be discussed in more detail in later sections, each of the GUIs can further show a fixed reticle graphic 804 (see, e.g., FIGS. 8, 9, and 10) overlaid on the real-time images 806 of the eye.

An operator can determine if the eye of the subject is optically aligned with certain components of the refractor device 138 (for example, the refractor light source 142 and the refractor camera 144) based on whether the GUIs show an anatomical feature of the eye within at least part of the fixed reticle graphic 804. The anatomical feature of the eye can be an anatomical structure or component of the eye selected based on its visibility and its locus relative to the pupil. In one example embodiment, the anatomical feature of the eye can be the limbus of the eye. In other embodiments, the anatomical feature of the eye can be an outer boundary of the iris.

The fixed reticle graphic 804 can comprise a number of circular shapes or voids. For example, the operator can adjust at least one of the chinrest assembly 102 or the head of the subject until the limbus of the eye is within (or surrounded by) at least one of the circular shapes or voids of the fixed reticle graphic 804.

In some embodiments, the fixed reticle graphic 804 can correspond to the center of the camera lens of the alignment camera 202. In other embodiments, the fixed reticle graphic 804 can correspond to another reference point in alignment with the refractor device 138 and the stimulus targets 200 to be displayed. As will be discussed in later sections, several pre-alignments steps can be undertaken to ensure the alignment camera 202 is optically aligned with the refractor device 138 and the stimulus targets 200 displayed on the far display 108 and the first beam splitter 118.

FIG. 1 also illustrates that the subject can view the stimulus target 200 displayed on the far display 108 (see, e.g., FIG. 5B) through the hot mirror 148, the first beam splitter 118, and the second beam splitter 150. As previously discussed, both the first beam splitter 118 and the second beam splitter 150 are angled to allow the subject to see through the beam splitters.

The system 100 can also comprise a far alignment light source 400 (see, e.g., FIG. 4) positioned at a distal end of the support assembly 124. In some embodiments, the far alignment light source 400 can be positioned on the same platform 152 as the second beam splitter 150 and the alignment camera 202. As will be discussed in more detail in later sections, the far alignment light source 400 can project a light marker 500 onto the far display 108 via the second beam splitter 150.

The light emitted by the far alignment light source 400 can be light in the visible spectrum (e.g., a colored laser light such as a red laser light). For example, the far alignment light source 400 can be a laser pointer. The light marker 500 can be used to determine where the stimulus target 200 is displayed on the far display 108. For example, the light marker 500 can be a red laser spot. The far alignment light source 400 can be used to ensure that the stimulus target 200 displayed on the far display 108 is in alignment with the line-of-sight 126 of the eye.

FIG. 1 also illustrates that the system 100 can comprise an input device 154. The input device 154 can be configured to receive user inputs from the subject concerning the stimulus target 200 displayed on the near display 116, the far display 108, or a combination thereof.

Figure 6:
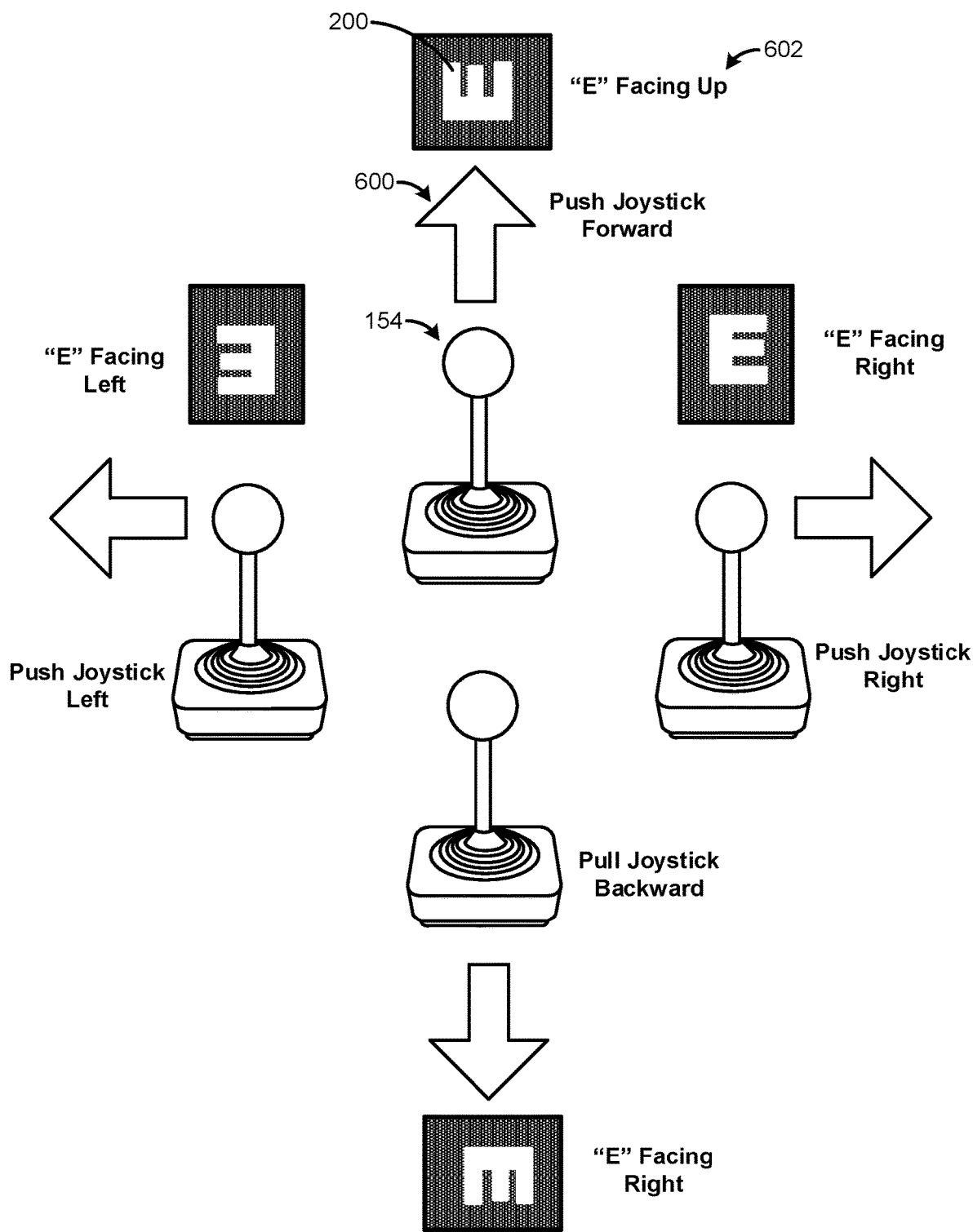
FIG. 6 illustrates that a joystick can be controlled by a subject to match a joystick movement to a rotational orientation of the stimulus target displayed.

In some embodiments, the input device 154 can be a joystick (see, e.g., FIG. 6). In other embodiments, the input device 154 can be a touchpad configured to receive a touch input, a keyboard configured to receive a key stroke, or a computer mouse configured to receive a mouse click. The input device 154 can be another type of computer input device known to those with skill in the art.

In some embodiments, the controller 128 can be programmed to direct the appearance of the stimulus target 200 on the far display 108 in a plurality of first rotational orientations (see FIG. 6 for an example of the different rotations orientations) for the first duration. In response to the stimulus targets 200 displayed, the controller 128 can receive user inputs from the input device 154 (e.g., joystick movements) corresponding to the first rotational orientations. The controller 128 can further be programmed to direct the appearance of the stimulus target 200 on the near display 116 (which is then projected onto the first beam splitter 118) in a plurality of second rotational orientations for the second duration. In response to the stimulus targets 200 displayed, the controller 128 can receive user inputs from the input device 154 (e.g., joystick movements) corresponding to the second rotational orientations.

As will be discussed in more detail in later sections, the stimulus target 200 can be a light-colored letter "E" displayed on a dark-colored background. The light-colored letter "E" can be rotated in different directions (such that the letter "E" appears to be tumbling) as it is being displayed on the far display 108 and then on the near display 116. In this example, the input device 154 can be a joystick. The subject can be instructed to coordinate the subject's joystick movements (e.g., a forward push motion, a backward pull motion, a leftward push motion, or a rightward push motion) to the rotational orientation of the letter "E" displayed. The controller 128 can then match the joystick movements with the rotational orientations to ensure that the subject was engaged and paying attention during the assessment.

The refractor device 138 can determine the refractive states of the eye as the subject focuses or attempts to focus on the rotating stimulus target 200 during the first duration and the second duration. The refractor device 138 can transmit the refractive states measured to the controller 128. The controller 128 can then determine the accommodative response of the eye based in part on these refractive states.

Figure 3A:
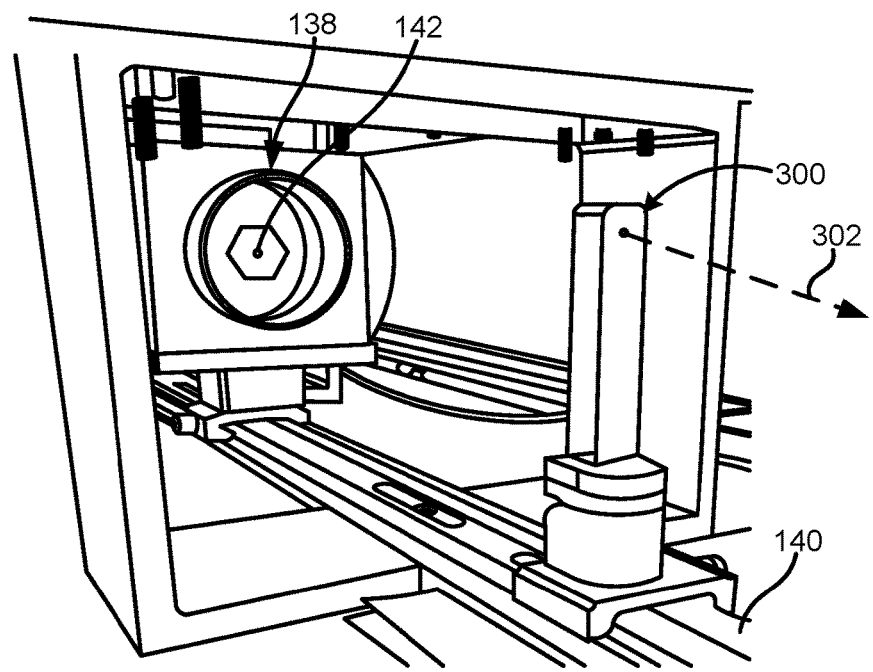
FIG. 3A illustrates a perspective view of one embodiment of a refractor alignment light source of the system.

FIG. 3A illustrates a perspective view of a refractor alignment light source 300. The refractor alignment light source 300 can be used by an operator to align the refractor device 138 with the alignment camera 202 in a pre-alignment procedure when initially setting up the system 100.

The refractor alignment light source 300 can be coupled to the rail 140 beneath the support assembly 124 (see, e.g., FIGS. 1 and 2). The refractor alignment light source 300 can be positioned in between the refractor device 138 and the angled mirror 146. The refractor alignment light source 300 can be coupled to the rail via a hinge-type connector. This is to allow the refractor alignment light source 300 to be folded or otherwise rotated downward (i.e., such that the refractor alignment light source 300 is parallel to the rail 140) when not in use so that the refractor alignment light source 300 does not block the refractor light source 142 (e.g., the IR/NIR light source) of the refractor device 138.

The refractor alignment light source 300 can emit a refractor alignment beam 302. The refractor alignment beam 302 can be a beam of visible light (e.g., green laser light) directed at the angled mirror 146 (see, e.g., FIGS. 1 and 2). The refractor alignment light source 300 can be sized and/or positioned such that the refractor alignment beam 302 mimics the illumination beam 141 emitted by the refractor light source 142 and the beam path of the refractor alignment beam 302 is aligned with the beam path of the illumination beam 141.

The angled mirror 146 and the hot mirror 148 can steer or otherwise direct the refractor alignment beam 302 to the eye of an operator when the chin of the operator is resting on the chinrest 104 (see, e.g., FIGS. 1 and 2). The operator can adjust at least one of the angled mirror 146 and the hot mirror 148 if the operator does not see the refractor alignment light source 300.

When the refractor alignment beam 302 (e.g., green laser light) is visible to the operator (for example, as a green laser spot on the hot mirror 148), the same operator or another operator can then adjust the alignment camera 202 (or a combination of the alignment camera 202 and the second beam splitter 150) until the refractor alignment beam 302 is aligned with a center of the camera lens of the alignment camera 202. As previously discussed, the center of the camera lens of the alignment camera 202 can correspond to a fixed reticle graphic 804 that is overlaid on real-time images 806 of the eye captured by the alignment camera 202 (see, e.g., FIGS. 8, 9, and 10). The real-time images 806 of the eye and the fixed reticle graphic 804 can be shown on a graphical user interface displayed on the controller display 136.

The same operator or another operator can check the graphical user interface to see if the refractor alignment beam 302 (e.g., shown as a laser spot such as a green laser spot) is aligned with a center of the fixed reticle graphic 804 or encompassed by the fixed reticle graphic 804. To do this, the same operator or another operator can sit where the subject would normally be sitting with the chin of the operator resting on the chinrest 104. Alternatively, an opaque or reflective object or surface can be held up behind the chinrest 104. When the refractor alignment beam 302 is aligned with the center of the fixed reticle graphic 804, this can indicate that the alignment camera 202 is optically aligned with the refractor device 138. Once the alignment camera 202 is aligned with the refractor device 138, a clinician needs to only confirm that an anatomical feature of the measured eye of a subject (e.g., the limbus of the subject's eye) is aligned with the fixed reticle graphic 804 to ensure that the measured eye is optically aligned with the alignment camera 202 and the refractor device 138.

As part of the pre-alignment procedure, the operator can also have the controller 128 instruct the near display 116 and the far display 108 to display the stimulus target 200 (this can be done one at a time) while the refractor alignment light source 300 is turned on. The same operator or another operator can then adjust the positioning of at least one of the first beam splitter 118 (or the first beam splitter 118 and the near display 116) and the far display 108 until the stimulus target 200 displayed on each of the first beam splitter 118 and the far display 108 is aligned with the refractor alignment beam 302. Moreover, the operator(s) can also input certain commands into the controller 128 to have the controller 128 adjust where the stimulus target 200 is displayed on the near display 116 and/or the far display 108.

Figure 3B:
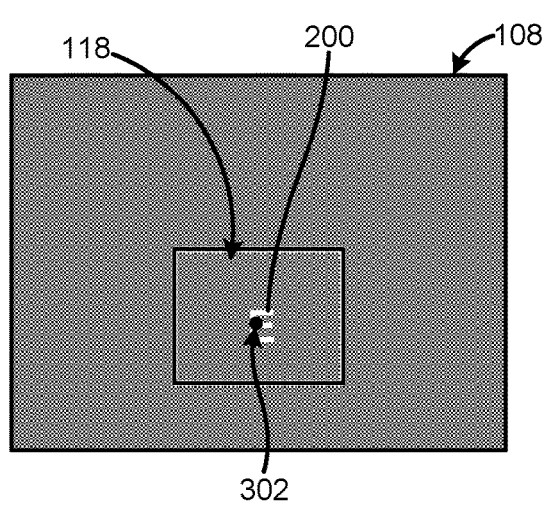
FIGS. 3B and 3C are schematic illustrations depicting instances where two stimulus targets are aligned.
Figure 3C:
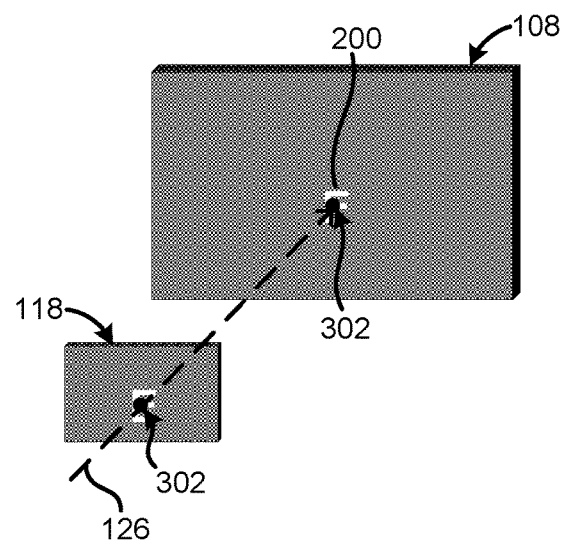

FIGS. 3B and 3C illustrate instances where the stimulus targets 200 are aligned with the refractor alignment beam 302 (shown as a laser spot in the figures). The stimulus targets 200 can be aligned with the refractor alignment beam 302 when the laser spot representing the refractor alignment beam 302 is seen on each of the stimulus targets 200 at approximately the same location (for example, when the stimulus target 200 is the letter "E," the laser spot can be seen at a midline of the vertical segment of the letter "E"). This can ensure not only that the two stimulus targets 200 displayed are aligned with each other but also that the stimulus targets 200 are displayed along an axis aligned with the line-of-sight 126 of the viewer (the viewer being either the operator or the subject) when the eye of the viewer is aligned with the fixed reticle graphic 804.

As will be discussed in more detail in the following sections, a far alignment light source 400 (see, e.g., FIG. 4) can also be used to facilitate alignment of the stimulus target 200 on the far display 108. Since the far display 108 can be moved by a clinician or operator after or in between testing sessions (whereas the first beam splitter 118 and the near display 116 are secured to the near display frame 120 and are less likely to be moved in between testing sessions), the far alignment light source 400 can ensure that the stimulus target 200 displayed on the far display 108 is in alignment with the stimulus target 200 projected on the first beam splitter 118 and the other components of the system 100.

FIG. 4 illustrates a top down perspective view of a portion of the system 100 showing the far alignment light source 400. The far alignment light source 400 can be positioned at a distal end of the support assembly 124. In some embodiments, the far alignment light source 400 can be positioned on the same platform 152 as the second beam splitter 150 and the alignment camera 202.

The far alignment light source 400 can emit a far alignment beam 402. The far alignment beam 402 can be a light beam in the visible spectrum (e.g., a colored laser light such as a red laser light). For example, the far alignment light source 400 can be a laser pointer (e.g., a red laser pointer).

The far alignment beam 402 can ultimately be directed at the far display 108. The far alignment beam 402 can serve as a light marker 500 (see, e.g., FIG. 5A) to mark the spot where the stimulus target 200 should be displayed on the far display 108. For example, the light marker 500 can be used by a clinician or an operator of the system 100 to determine a region or area on the far display where the stimulus target 200 should be displayed. As a more specific example, the light marker 500 can be a red laser spot.

As previously discussed, the far alignment light source 400 can be used to ensure that the stimulus target 200 displayed on the far display 108 is in alignment with the stimulus target 200 projected on the first beam splitter 118 and the line-of-sight 126 of the eye. The far alignment light source 400 can be used as part of a final step in a pre-alignment procedure.

As shown in FIG. 4, the far alignment light source 400 can face the alignment camera 202. The far alignment light source 400 can be positioned such that the far alignment beam 402 is aligned with the center of the camera lens of the alignment camera 202 (e.g., a red laser spot is visible in the center of the camera lens of the alignment camera 202 when the far alignment light source 400 is turned on).

When the second beam splitter 150 is put into position between the alignment camera 202 and the far alignment light source 400, at least some of the far alignment beam 402 can be reflected or steered by the second beam splitter 150 to the far display 108 positioned distally of the platform 152. Since the second beam splitter 150 is already positioned at a 45 degree angle with respect to the alignment camera 202, the far alignment beam 402 can also hit the second beam splitter 150 at a 45 degree angle (since the far alignment beam 402 is aligned with the center of the camera lens of the alignment camera 202). When the far alignment light source 400 is aligned in this manner, the far alignment beam 402 reaching the far display 108 should also be aligned with the line-of-sight 126 (see, e.g., FIG. 1) of the eye of the subject and the stimulus target 200 on the first beam splitter 118.

One technical advantage of the set-up shown in FIG. 4 is that the far alignment light source 400 and the alignment camera 202 share the same beam splitter (that is, they both use the second beam splitter 150) even though the beam splitter is being used for different purposes. For example, the far alignment light source 400 is using the second beam splitter 150 to direct the far alignment beam 402 to the far display 108 as part of a pre-alignment step while the alignment camera 202 is using the second beam splitter 150 to capture images of the eye of the subject during a subject-oriented procedure (e.g., an alignment procedure, a calibration procedure, and/or an accommodation procedure).

Figure 5A:
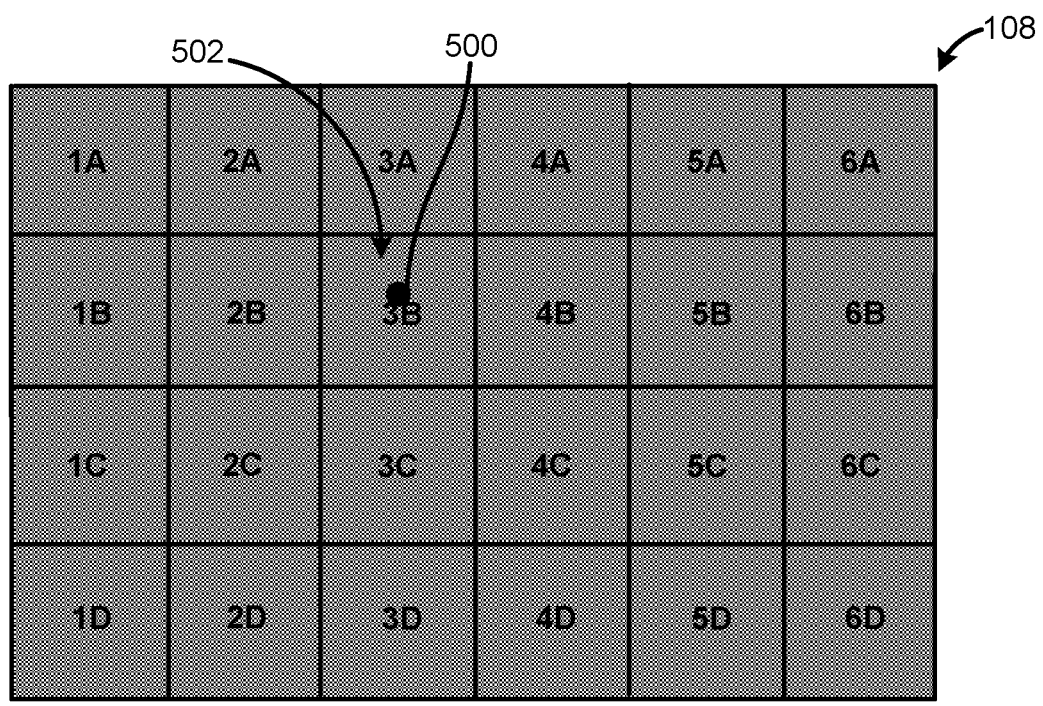
FIG. 5A illustrates a far display of the system displaying a plurality of possible regions where a stimulus target can be displayed.

FIG. 5A illustrates the far display 108 displaying a plurality of possible regions 502 where the stimulus target 200 can be displayed. For example, the far display 108 can be divided up into 24 regions. The regions 502 can be displayed as squares formed by intersecting gridlines. It should be understood by one of ordinary skill in the art and it is contemplated by this disclosure that the number of regions 502 and the shapes of such regions 502 can be adjusted based on the size of the far display 108 and the size and shape of the stimulus target 200.

As previously discussed, the far display 108 can be an LCD screen and the regions 502 and stimulus target 200 can be rendered as graphics on the LCD screen.

The regions 502 can be displayed when the far alignment beam 402 (see, e.g., FIG. 4) is directed at the far display 108 resulting in a light marker 500 (e.g., a red laser spot) being cast in at least one of the regions 502. Once the light marker 500 appears in a region 502, an operator or clinician can then input commands or apply a user input to the controller 128 via an input device (e.g., a keyboard or mouse) to instruct the far display 108 to display the stimulus target 200 in that particular region 502 (in FIG. 5A, this region is the region 502 labeled "3B"). For example, the operator or clinician can select a region number from a drop-down menu of all of the region numbers shown on the controller display 136.

In cases where the light marker 500 appears on a border between two regions 502 or where parts of the light marker 500 appear in adjoining regions 502, the far display 108 can be moved until the light marker 500 is encompassed in only one region 502.

Figure 5B:
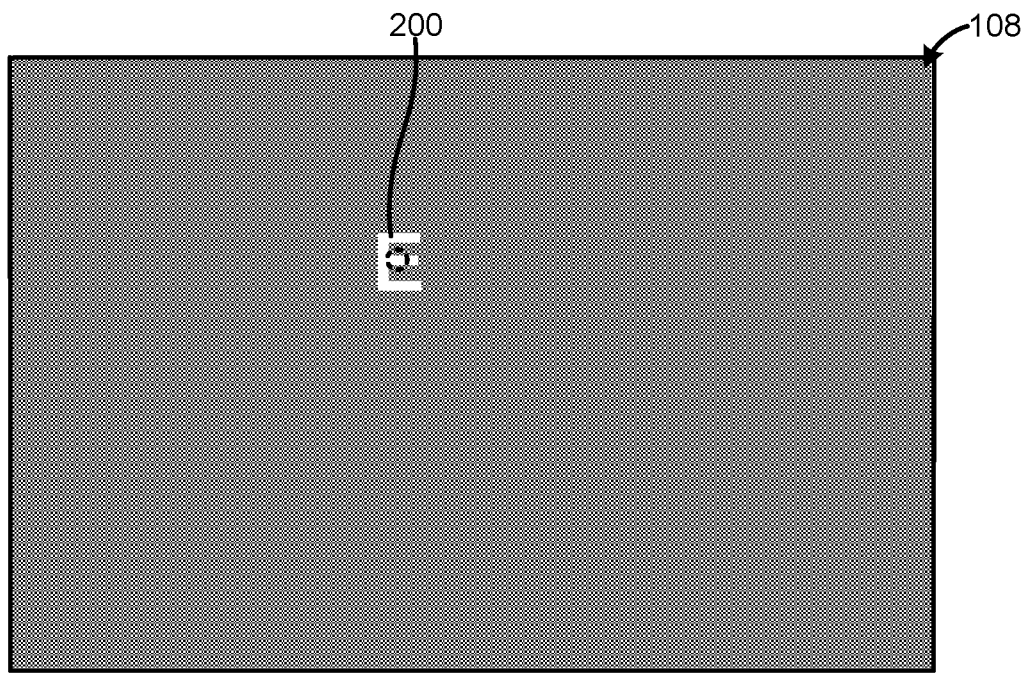
FIG. 5B illustrates that once a region is selected out of the possible regions the stimulus target can be displayed in that region.

FIG. 5B illustrates that once the region 502 is selected, the stimulus target 200 can be displayed in that region 502. In some embodiments, the stimulus target 200 can be displayed such that the stimulus target 200 overlaps the light marker 500 (seen in phantom in FIG. 5B). In other embodiments, the stimulus target 200 can be displayed such that the light marker 500 appears in the center of the stimulus target 200 or at a midline of a vertical or horizontal element of the stimulus target 200. The graphics showing the regions 502 can then be hidden from view when the stimulus target 200 is displayed.

The aforementioned steps of aligning the stimulus target 200 on the far display 108 using the far alignment light source 400 and the displayed regions 502 may be necessary when the far display 108 is moved after or in between testing sessions. For example, the far display 108 can be an LCD screen affixed to a moveable mount (e.g., a wheeled-mount). The far display 108 may need to be moved after a session to allow the clinician to change the setup of a clinical office to run other ophthalmic tests.

One technical problem faced by the applicants is how to prevent the clinician or another operator of the system 100 from having to re-align the other components of the system 100 every time the far display 108 is moved (for example, to make room for other test equipment in the clinician's office). One technical solution discovered and developed by the applicants is the quick alignment procedure involving the far alignment light source 400 and the far display 108 displaying a plurality of possible regions 502. As previously discussed, the stimulus target 200 can be displayed within a region 502 encompassing a light marker 500 cast by the far alignment light source 400 on the far display 108. Using these components and the method disclosed herein, a clinician can quickly figure out where to display an aligned instance of the stimulus target 200 on the far display 108, even if the far display 108 was previously moved.

FIG. 6 illustrates that a joystick serving as the input device 154 can be controlled by the subject to match a joystick movement to a rotational orientation 602 of the stimulus target 200 displayed. The joystick movement can be an example of a user input 600.

The controller 128 can be programmed to direct the appearance of the stimulus target 200 on a display (either the far display 108 or the near display 116) in a plurality of rotational orientations 602. For example, the controller 128 can direct the displays to show the stimulus target 200 as being upward-facing, leftward-facing, rightward-facing, or downward-facing. In response to the stimulus targets 200 displayed, the subject can apply user inputs 600 (e.g., joystick movements) to the input device 154 corresponding to the rotational orientations 602.

In some embodiments, the stimulus target 200 can be rotated in a random pattern (that is not a series of predictable clockwise or counterclockwise rotations). In other embodiments, the stimulus target 200 can partly be rotated in a set pattern (e.g., a clockwise or counterclockwise rotational pattern) and partly in a random pattern.

For example, as shown in FIG. 6, the stimulus target 200 can be a light-colored letter "E" displayed on a dark-colored background. The light-colored letter "E" can be rotated in different directions (such that the letter "E" appears to be tumbling) as it is being displayed over a period of time on the display (either the far display 108 or the near display 116). In this example, the subject can coordinate the subject's joystick movements to the rotational orientation of the letter "E" displayed. More specifically, a forward push motion applied to the joystick can match an instance where the letter "E" is shown facing upward, a backward pull motion can match an instance where the "E" is shown facing downward, a rightward push motion can match an instance where the "E" is shown facing right (a normal "E"), and a leftward push motion can match an instance where the "E" is shown facing left (a mirror image "E").

Eliciting user inputs 600 from the subject in the form of joystick movements can be a way to ensure that the subject is engaged with the accommodation test and is paying attention during the testing session. For example, continuously rotating the stimulus target 200 can force the subject to be alert and continuously keep or attempt to keep the stimulus target 200 in focus.

In some embodiments, the user inputs 600 received from the subject can be evaluated and matched against the rotational orientations 602 of the stimulus target 200. In these embodiments, a testing session can be stopped or aborted if enough of the subject's user inputs 600 do not match the rotational orientations 602 of the stimulus target 200 displayed. In certain embodiments, thresholds can be set such that a testing session is stopped or aborted if a predetermined threshold number of mismatches are detected (that is, a maximum threshold is reached).

In other embodiments, the user inputs 600 are not counted by the system 100 but the subject is still encouraged to match the user inputs 600 to the rotational orientations 602 to maintain the subject's engagement during a testing session.

One technical problem faced by the applicants is how to keep the subject alert and engaged during the accommodation assessment such that the subject exerts sufficient effort to keep the stimulus target 200 in focus at all times. One technical solution discovered and developed by the applicants is to continuously rotate the stimulus target 200 and require the subject to match user inputs 600 to an input device (e.g., joystick movements) to the rotational orientations 602 of the stimulus target 200. This way, the subject continuously exerts effort to focus on the stimulus target 200 during the testing period to make out the different rotational orientations 602.

Figure 7:
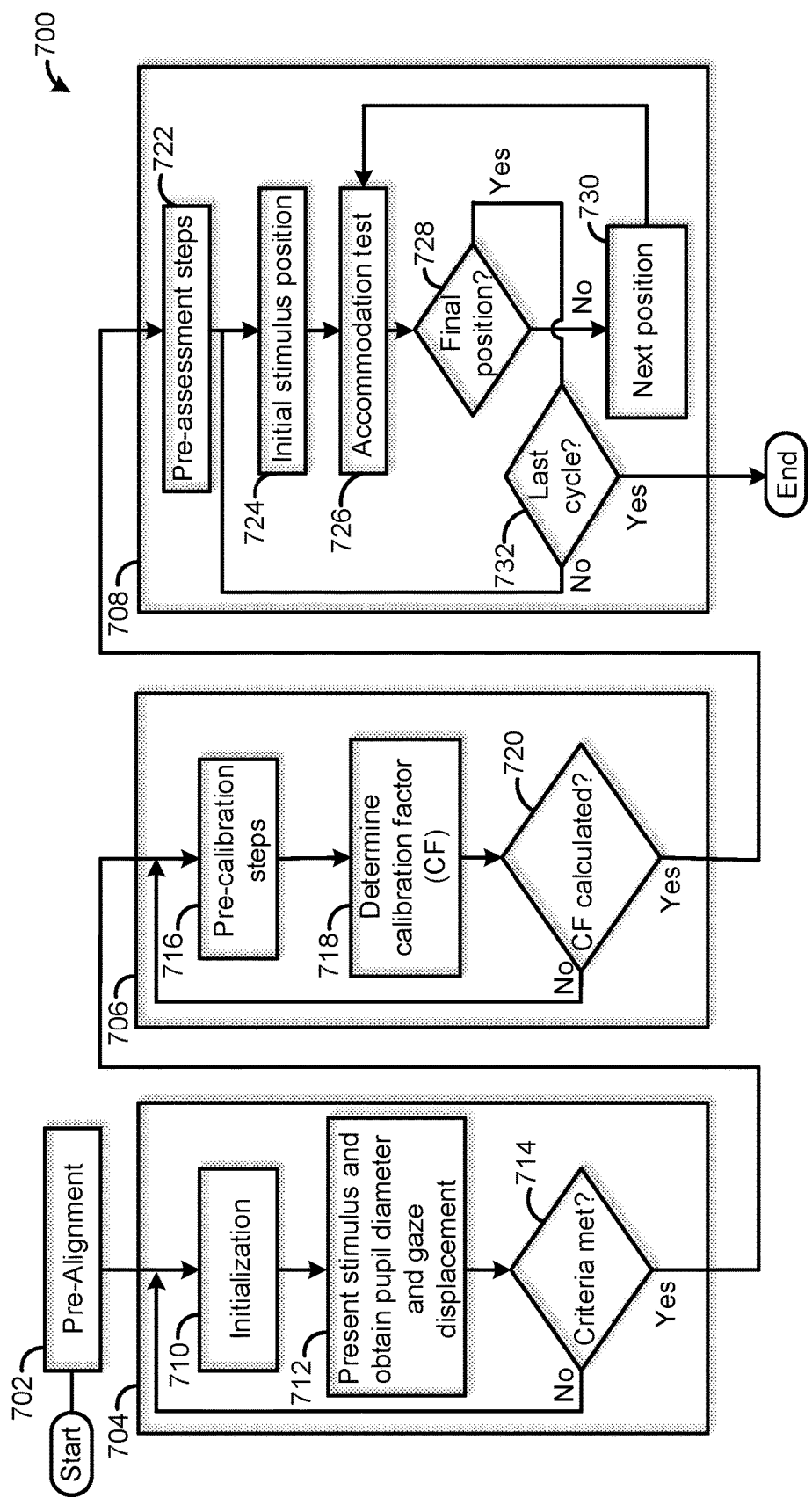
FIG. 7 illustrates one embodiment of a method of objectively assessing accommodation in an eye.

FIG. 7 is a flowchart illustrating one embodiment of a method 700 of objectively assessing accommodation in an eye using the components of the system 100 disclosed herein. For example, certain steps of the method 700 can be executable by the controller 128 of FIG. 1. Various outputs from the method 700 can also be rendered and displayed through the graphic user interfaces (GUIs) shown in FIGS. 8-10. It should also be understood by one of ordinary skill in the art that some method steps can be omitted for the sake of brevity and the method 700 need not be applied in the specific order shown and recited herein.

The method 700 can begin with several pre-alignment steps 702. The method can then proceed to a series of alignment steps 704 (also referred to as an alignment procedure 704), calibration steps 706 (also referred to as a calibration procedure 706), and accommodation assessment steps 708 (also referred to as an accommodation procedure 708).

The pre-alignment steps 702 can involve aligning certain components of the system 100 with one another. For example, the pre-alignment steps 702 can comprise using the refractor alignment light source 300 to align the refractor device 138 with the alignment camera 202 (see, e.g., FIGS. 1, 2, and 3). An operator of the system 100 (e.g., a clinician or technician) can adjust at least one of the angled mirror 146 and the hot mirror 148 (see, e.g., FIGS. 1 and 2) if the operator does not see the refractor alignment light source 300 when seated where the subject would be seated. When the refractor alignment beam 302 (e.g., green laser light) is visible to the operator (for example, as a green laser spot on the hot mirror 148), the same operator or another operator can then adjust the alignment camera 202 (or a combination of the alignment camera 202 and the second beam splitter 150) until the refractor alignment beam 302 is aligned with a center of the camera lens of the alignment camera 202.

In some embodiments, the center of the camera lens of the alignment camera 202 can correspond to a fixed reticle graphic 804 that is rendered as being overlaid on real-time or near-real-time images 806 of the eye captured by the alignment camera 202. The fixed reticle graphic 804 and the real-time or near-real-time images 806 of the eye can be displayed as part of various graphical user interfaces (GUIs) (e.g., an alignment GUI 800, a calibration GUI 900, and an accommodation GUI 1000) shown to the operator/clinician on the controller display 136 (see, e.g., FIGS. 8, 9, and 10).

Moreover, the pre-alignment steps 702 can comprise the operator adjusting the positioning of at least one of the first beam splitter 118 (or the first beam splitter 118 and the near display 116) and the far display 108 until the stimulus target 200 displayed on each of the first beam splitter 118 and the far display 108 is axially aligned with one another and with the line-of-sight 126 of a viewer when the eye of the viewer is aligned with the fixed reticle graphic 804. The viewer in this case can be the operator or another individual helping the operator align the equipment.

Moreover, the operator can adjust the positioning of at least one of the first beam splitter 118 (or the first beam splitter 118 and the near display 116) and the far display 108 until the stimulus target 200 displayed on each of the first beam splitter 118 and the far display 108 is axially aligned with the refractor alignment beam 302. For example, the stimulus targets 200 can be aligned with the refractor alignment beam 302 (and each other) when a laser spot representing the refractor alignment beam 302 is seen on each of the stimulus targets 200 at approximately the same location (for example, when the stimulus target 200 is the letter "E," the laser spot can be seen at a midline of the vertical segment of the letter "E") (see, e.g., FIGS. 3B and 3C).

The pre-alignment steps 702 can also comprise using a far alignment light source 400 (e.g., a red laser pointer, see FIG. 4) to determine where the stimulus target 200 should be displayed on the far display 108. This can be done initially as part of an equipment alignment procedure and, subsequent to that, each time the far display 108 is moved by a clinician or operator.

For example, the pre-alignment steps 702 can further comprise displaying or rendering on the far display 108 a plurality of possible regions 502 where the stimulus target 200 can be displayed (see, e.g., FIG. 5A). The pre-alignment steps 702 can further comprise using the far alignment light source 400 to direct a far alignment beam 402 at the far display 108. This can result in a light marker 500 (e.g., a red laser spot) being cast in at least one of the regions 502 (see, e.g., FIG. 5A). Once the light marker 500 appears in a region 502, an operator or clinician can then input commands or apply a user input to the controller 128 via an input device (e.g., a keyboard or mouse) to instruct the far display 108 to display the stimulus target 200 in that particular region 502 (see, e.g., FIG. 5B). Once the region 502 is selected, the stimulus target 200 can be displayed in the selected region 502.

In some embodiments, the pre-alignment steps 702 can comprise displaying the stimulus target 200 such that the stimulus target 200 overlaps the light marker 500. In other embodiments, the pre-alignment steps 702 can comprise displaying the stimulus target 200 such that the light marker 500 appears in the center of the stimulus target 200 or at a midline of a vertical or horizontal element of the stimulus target 200. The graphics showing the possible regions 502 can then be hidden from view when the stimulus target 200 is displayed.

In some embodiments, all of the pre-alignment steps 702 described heretofore can be undertaken without involving the subject (for example, the operator of the system 100 can perform these steps). In other embodiments, at least some of the pre-alignment steps 702 can involve the subject.

Once the pre-alignment steps 702 are performed, the method 700 can proceed to the alignment steps 704. From this point forward, the method 700 involves the subject.

The alignment steps 704 can begin with one or more initialization steps 710 such as the operator or clinician bringing up the alignment GUI 800 on the controller display 136 (see, e.g., FIG. 8) and activating or turning on the various components of the system 100 such as the alignment camera 202 and the refractor device 138.

The subject can then be directed to place the subject's chin on the chinrest 104 and to look toward the far display 108 with both eyes open.

The initialization steps 710 can then comprise the operator or clinician checking the display window 808 on the accommodation GUI 1000 to ensure that an anatomical feature of the measured eye of the subject (for example, the limbus of the eye) is within at least part of the fixed reticle graphic 804 shown in the display window 808 (for example, a central circular shape of the fixed reticle graphic 804). If this is the case, the eye of the subject is considered to be aligned with the system 100 and the rest of the alignment procedure 704 can begin starting with step 712.

Step 712 can comprise displaying certain visual stimulus to the subject and obtaining, from the refractor device 138, measurements concerning a pupil diameter 812 and a gaze displacement 814 (see, e.g., FIG. 8) of the eye of the subject. For example, the controller 128 can be programmed to direct the far display 108 to display the stimulus target 200 for a first accommodation duration and to direct the near display 116 to display the stimulus target 200 (which is then projected onto the first beam splitter 118 for viewing by the subject) for a second accommodation duration.

In some embodiments, the first accommodation duration can be less than the amount of time that the stimulus target 200 is displayed on the far display 108 during the actual accommodation procedure 708. For example, the first accommodation duration and the second accommodation duration can each be approximately 5 seconds while the stimulus target 200 is displayed for 10 seconds on each of the far display 108 and the near display 116 for the actual assessment accommodation procedure 708.

The controller 128 can also be programmed to direct the appearance of the stimulus target 200 (either on the far display 108 or the near display 116) in a plurality of rotational orientations 602 (e.g., any combination of upward-facing, leftward-facing, rightward-facing, or downward-facing). In response to the stimulus targets 200 displayed, the subject can be directed to apply user inputs 600 (e.g., joystick movements) to the input device 154 corresponding to the rotational orientations 602. In some embodiments, the stimulus target 200 can be rotated in a random pattern (that is not a series of predictable clockwise or counterclockwise rotations). In other embodiments, the stimulus target 200 can partly be rotated in a set pattern (e.g., a clockwise or counterclockwise rotational pattern) and partly in a random pattern. Rotating the stimulus targets 200 and directing the subject to apply the user inputs 600 can keep the subject engaged during the alignment procedure 704.

The near display assembly 106 (or at least one of the near display 116 and the first beam splitter 118) can be initially positioned at a stimulus position 110 furthest from the eye of the subject (such as the 0.80 meters stimulus position 110) prior to the stimulus target 200 being displayed. Once the stimulus target 200 is displayed on the far display 108 and the near display 116 in succession, the near display assembly 106 can be moved to the next stimulus position 110 (e.g., a stimulus position 110 closer to the eye of the subject). This process can be repeated until the near display assembly 106 is moved to the stimulus position 110 closest to the eye of the subject. In this manner, the stimulus targets 200 are presented in a way that mimics the presentation of the stimulus targets 200 during the upcoming accommodation procedure 708, albeit in an abbreviated fashion. During this time, the refractor device 138 is measuring a pupil diameter 812 and a gaze displacement 814 (see, e.g., FIG. 8) of the eye of the subject and transmitting such data to the controller 128.

Figure 8:
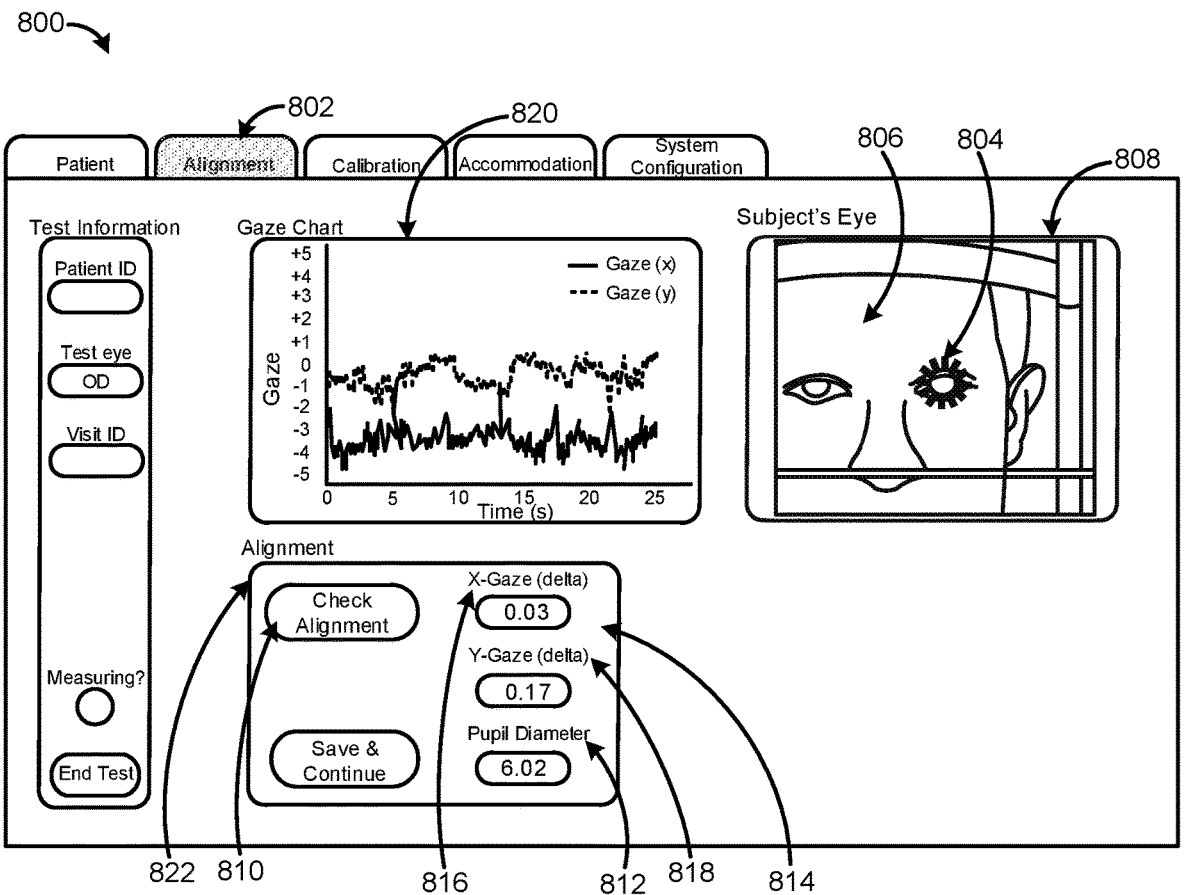
FIG. 8 illustrates one embodiment of an alignment graphical user interface (GUI).

The gaze displacement 814 can comprise a horizontal gaze displacement 816 and a vertical gaze displacement 818 (see, e.g., FIG. 8). In certain embodiments, a mean pupil diameter or a mean gaze displacement can also be calculated by the controller 128.

Certain predefined criteria or thresholds can be set concerning the alignment measurements. Step 714 can comprise determining whether the pupil diameter 812 and the gazed displacement 814 of the subject meet the predefined criteria. The alignment procedure 704 can be set up such that the subject does not advance to the calibration phase or the calibration procedure 706 unless the alignment measurements meet the predefined criteria.

The predefined criteria can comprise maximum values for the gaze displacement 814 and a minimum value for the pupil diameter 812. In some embodiments, the maximum displacement threshold can be approximately 5 degrees or 4 degrees. In other embodiments, the maximum displacement threshold can be less than 4 degrees such as 3 degrees or 2 degrees. The subject can be instructed to keep the subject's focus on the stimulus target 200 and not let their gaze wander or drift-off. Also, a minimum diameter threshold can be set for the pupil diameter 812. In some embodiments, the minimum diameter threshold can be approximately 3.5 mm. In other embodiments, the minimum diameter threshold can be approximately 3.0 mm or 4.0 mm. If the subject's pupil diameter 812 is measured to be less than the minimum diameter threshold, a clinician can determine whether applying non-cycloplegic dilation drops can increase the subject's pupil size.

If the pupil diameter 812 and the gazed displacement 814 of the subject meet the predefined criteria, the method 700 can proceed to the calibration phase or the calibration steps 706. If either the pupil diameter 812 or the gazed displacement 814 (either the horizontal gaze displacement 816 or the vertical gaze displacement 818) of the subject does not meet the predefined criteria, the alignment procedure 704 can be repeated for at least two more times before switching to the subject's other eye.

The calibration procedure 706 is needed since the eye pigments of a subject and ambient light in the testing/clinical environment can affect the intensity of light received and evaluated by the refractor device 138. As such, the refractor device 138 must be calibrated for each subject and each time the subject returns to the testing/clinical environment.

The calibration procedure 706 can begin with several pre-calibration steps 716. For example, the pre-calibration steps 716 can comprise the operator or clinician bringing up the calibration GUI 900 on the controller display 136 (see, e.g., FIG. 9) by applying a user input to a calibration tab 902. The pre-calibration steps 716 can also comprise the operator or clinician confirming that the measured eye is still aligned with the system 100 by checking the display window 808 on the accommodation GUI 1000 to ensure that an anatomical feature of the eye (e.g., the limbus of the eye) is within at least part of the fixed reticle graphic 804 shown in the display window 808. The pre-calibration steps 716 can further comprise the operator or clinician placing an IR filter and a trial lens of a specific diopter strength in front of the eye of the subject.

Step 718 can comprise directing the subject to look at the far display 108 (with both eyes open) while the refractor device 138 takes measurements of the refractive state of the eye covered by the trial lens. Once the controller 128 has received the measurements from the refractor device 138, a new trial lens of a different diopter strength can then be placed in front of the eye of the subject and new refraction measurements taken. These steps can be repeated until refraction measurements are taken using trial lenses of several different diopter strengths. In some embodiments, trial lenses of the following diopter strengths can be used as part of the calibration procedure 706: +4.0 D, +3.0 D, +2.0 D, +1.0 D, 0.0, −1.5 D and −2.5 D.

The controller 128 can then use the refraction measurements to determine mean or average refraction values for the various trial lenses used. For example, the controller 128 can determine a mean or average refraction value for each trial lens of a specific diopter strength or power.

The controller 128 can then plot the different diopter strengths of the trial lenses against the average or mean refraction values. The controller 128 can then be programmed to fit a line 906 (see, e.g., FIG. 9) to the datapoints of the different diopter strengths of the trial lenses plotted against the average or mean refraction values using a regression technique (e.g., R-squared regression). Finally, the controller 128 can be programmed to calculate a slope of the line 906 to be used as a calibration factor 908 (see, e.g., FIG. 9).

Step 720 can determine whether the calibration factor 908 was successfully calculated, if the calibration factor 908 was successfully calculated from the slope of the regressed line, the method 700 can proceed to the accommodation procedure 708. If a calibration factor 908 was not calculated (for example, if a line could not be fitted to the datapoints), the calibration procedure 706 can be repeated for at least two more times before the calibration procedure 706 is attempted on the subject's other eye.

The accommodation procedure 708 can begin with certain pre-assessment steps 722. The pre-assessment steps can comprise the operator or clinician bringing up the accommodation GUI 1000 on the controller display 136 (see, e.g., FIG. 10) by applying a user input to an accommodation tab 1002. The pre-assessment steps 722 can also comprise the operator or clinician confirming, once again, that the measured eye is still aligned with the system 100 by checking the display window 808 on the accommodation GUI 1000 to ensure that an anatomical feature of the eye (e.g., the limbus of the eye) is within at least part of the fixed reticle graphic 804 shown in the display window 808. The pre-assessment steps 722 can further comprise the operator or clinician removing the IR filter or trial lens from the eye of the subject.

The accommodation procedure 708 can further comprise translating the near display assembly 106 (including the near display 116 and the first beam splitter 118) to the stimulus position 110 furthest from the eye of the subject (such as the 0.80 meters stimulus position 110) in step 724. The near display assembly 106 can be translated automatically via the motorized stage 122 on the support assembly 124 (see, e.g., FIGS. 1, 2, and 4).

The accommodation procedure 708 can further comprise several stimulus-driven testing steps 726 to assess the accommodation of the eye. For example, the testing steps 726 can comprise displaying, at the far display 108, the stimulus target 200 for a first duration of time (e.g., about 10 seconds) while rotating the stimulus target 200 in a plurality of rotational orientations 602. The testing steps 726 can also comprise displaying, at the near display 116, the stimulus target 200 for a second duration of time (e.g., about 10 seconds) while rotating the stimulus target 200 in a plurality of rotational orientations 602. The subject can be instructed to focus on the rotating stimulus target 200 and to keep the stimulus target 200 as sharp as possible.

The stimulus target 200 displayed by the near display 116 can be projected onto the first beam splitter 118 for viewing by the eye of the subject. While the rotating stimulus target 200 is presented to the subject during the first duration and the second duration, the refractor device 138 can be measuring the refractive states of the eye. Moreover, during this same period, the controller 128 can receive user inputs 600 applied to the input device 154 by the subject that attempt to match the user inputs 600 with rotational orientations 602. For example, the user inputs 600 can be joystick movements made by the subject in directions associated with the rotational orientations 602 of the stimulus target 200 displayed.

Although rotating the stimulus target 200 is discussed and shown in FIG. 6, it is contemplated by this disclosure and it should be understood by one of ordinary skill in the art that the same accommodation procedure 708 can be undertaken without rotating the stimulus target 200.

In some embodiments, the refractor device 138 can measure the refractive states of the eye using eccentric photorefraction. For example, the refractive device can measure the refractive states of the eye by generating and directing an illumination beam 141 (e.g., an IR/NIR beam) at the eye of the subject (see, e.g., FIG. 1). The illumination beam 141 can be generated by the refractor light source 142 and the illumination beam 141 can be steered by the angled mirror 146 and the hot mirror 148 positioned above the angled mirror 146 to the eye of the subject. The refractor device 138 can then capture or detect, using the refractor camera 144, light reflected by the eye of the subject (e.g., IR/NIR light) in response to the illumination beam 141. The light reflected by the eye can be directed back toward the refractor device 138 via the hot mirror 148 and the angled mirror 146.

The controller 128 can obtain the measurements made by the refractor device 138 concerning the refractive states of the eye during the first duration of time and the second duration of time. The refractor device 138 can be capable of taking measurements at a rate of 50 Hz or one measurement every 20 ms. The testing steps 726 can also comprise determining, using the controller 128, the accommodative response of the eye (see, e.g., FIG. 10) based in part on the refractive states obtained from the refractor device 138.

In certain embodiments, the accommodative response of the eye is determined based in part on the refractive states obtained from the refractor device 138 and the user inputs 600. For example, the user inputs 600 received from the subject can be evaluated and matched against the rotational orientations 602 of the stimulus target 200. In these embodiments, the accommodation procedure 708 can be stopped or aborted if enough of the subject's user inputs 600 do not match the rotational orientations 602 of the stimulus target 200 displayed. In certain embodiments, thresholds can be set such that the accommodation procedure 708 is stopped or aborted only if a predetermined threshold number of mismatches are detected (that is, a maximum threshold is reached). In other embodiments, the user inputs 600 are not counted by the system 100 but the subject is still encouraged to match the user inputs 600 to the rotational orientations 602 to maintain the subject's engagement during the accommodation procedure 708.

In some embodiments, determining the accommodative response of the eye can comprise calculating mean or average refraction values from the measurements made by the refractor device 138. For example, the controller 128 can calculate a mean near refraction value ($X_N$) from all of the refraction measurements made by the refractor device 138 during the first duration of time (when the stimulus target 200 is displayed at the far display 108). Also, for example, the controller 128 can calculate a mean far refraction value ($X_F$) from all of the refraction measurements made by the refractor device 138 during the second duration of time (when the stimulus target 200 is displayed at the near display 116). The mean near refraction value ($X_N$) and the mean far refraction value ($X_F$) are raw refraction measurements that have not been scaled.

The accommodative response at that particular stimulus position 110 (the stimulus position 110 furthest from the eye) can then be calculated by subtracting the mean near refraction value ($X_N$) from the mean far refraction value ($X_F$) and multiplying the result by the calibration factor (CF) 908 calculated from the calibration procedure 706 (see Formula I below).

$$\text{Accommodative Response} = CF*(X_F - X_N) \quad \text{(Formula I)}$$

The accommodation procedure 708 can further comprise determining whether the near display assembly 106 has reached its final stimulus position 110 (e.g., the stimulus position closest to the eye of the subject) in step 728. If the near display assembly 106 has not reached its final stimulus position 110, the near display assembly 106 can be automatically translated to the next stimulus position 110 in step 730 and the testing steps 726 can be repeated at the new stimulus position 110 (i.e., the stimulus target 200 is shown first on the far display 108 and then on the near display 116).

Figure 10:
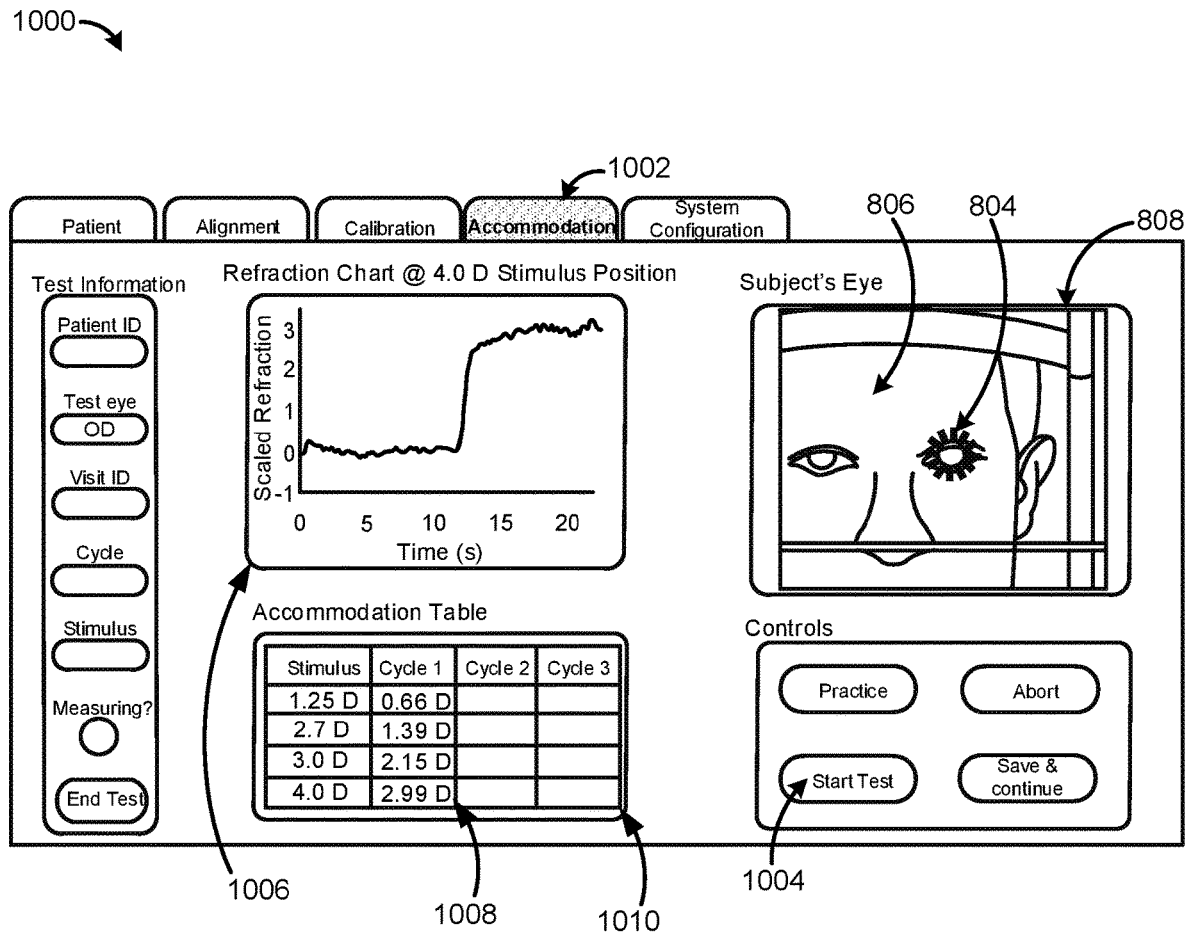
FIG. 10 illustrates one embodiment of an accommodation GUI.

Once the near display assembly 106 is moved to the final stimulus position 110 (e.g., the stimulus position 110 closest to the eye of the subject or the 4.0 D/0.25 meters stimulus position 110), the accommodative response calculated at each stimulus position 110 can be listed in an accommodation table 1010 included as part of the accommodation GUI 1000 (see, e.g., FIG. 10).

The accommodation procedure 708 can further comprise determining whether another cycle of testing is desired in step 732. A cycle can refer to moving the near display assembly 106 to all of the stimulus positions 110 and determining accommodative responses at each of the stimulus positions 110. In some embodiments, the accommodation procedure 708 can conclude when the system 100 has completed three cycles. In other embodiments, step 732 can comprise querying the clinician or operator (e.g., via a pop-up window displayed on the accommodation GUI 1000) whether another cycle of testing is desired. If another cycle of testing is desired, the near display assembly 106 is automatically moved back to the initial stimulus position 110 and the subject is informed that the test will start again.

The entire method 700 can conclude when the last cycle of testing is completed. At this point, all of the accommodative responses calculated can be presented in an accommodation table 1010 of the accommodation GUI 1000. Moreover, a subject response curve 1202 can be generated using the accommodative response and the subject response curve 1202 can be presented alongside an idealized response curve 1200 (see, e.g., FIG. 12). In additional embodiments, the patient data collected as part of the accommodation assessment can be made available for transmission to a cloud-based database or printing.

FIG. 8 illustrates one embodiment of an alignment GUI 800 that can be displayed on the controller display 136 during the alignment procedure 704. An operator or clinician can access the alignment GUI 800 by selecting an alignment tab 802 on a main GUI presented to the operator or clinician for operating the system 100. In some embodiments, the main GUI can be displayed on the controller display 136.

Figure 9:
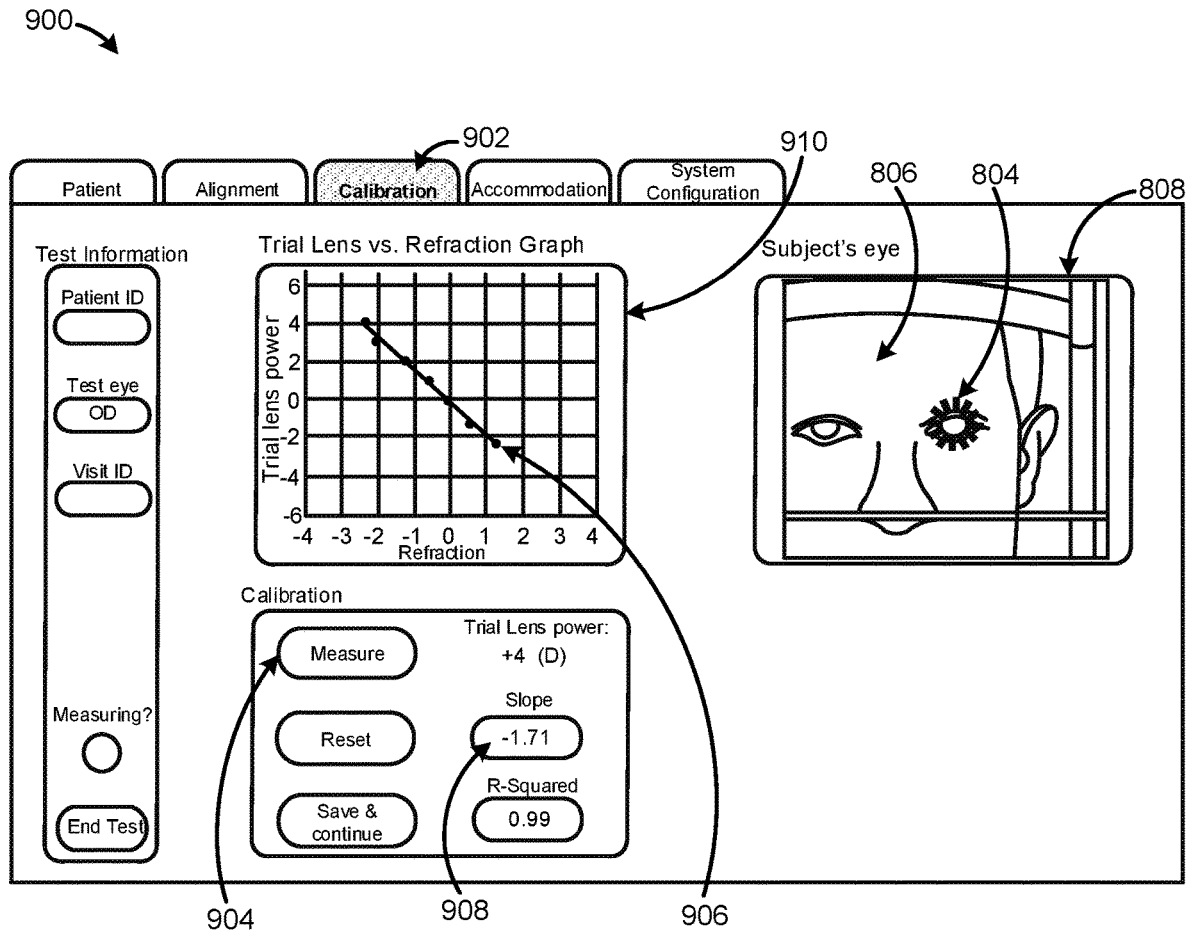
FIG. 9 illustrates one embodiment of a calibration GUI.

As previously discussed, the alignment GUI 800 (along with the calibration GUI 900 and the accommodation GUI 1000, see FIGS. 9 and 10, respectively) can show a fixed reticle graphic 804 overlaid on real-time images 806 of the eye captured by the alignment camera 202 and displayed via a display window 808.

The operator or clinician can determine if the eye of the subject is aligned with the refractor device 138 (including the refractor light source 142 and the refractor camera 144) based on whether the display window 808 shows an anatomical feature of the eye within at least part of the fixed reticle graphic 804. Moreover, when the anatomical feature of the eye is within at least part of the fixed reticle graphic 804, the line-of-sight 126 of the eye is axially aligned with the stimulus targets 200 displayed on the far display 108 and the first beam splitter 118.

For example, the anatomical feature of the eye can be an anatomical structure or component of the eye selected based on its visibility and its locus relative to the pupil. In one example embodiment, the anatomical feature of the eye can be the limbus of the eye. In other embodiments, the anatomical feature of the eye can be an outer boundary of the iris.

The fixed reticle graphic 804 can comprise a number of lines arranged radially around a central circular void. The radially-arranged lines can define a central circular shape. The eye of the subject can be considered aligned when an anatomical feature of the eye (such as the limbus of the eye) is positioned within or surrounded by the central circular shape defined by the radially-arranged lines. For example, the operator or clinician can adjust the chinrest assembly 102 (including the chinrest 104), the head of the subject, or a combination thereof until the limbus of the eye of the subject is within the central circular shape of the fixed reticle graphic 804.

As previously discussed, the fixed reticle graphic 804 can correspond to the center of the camera lens of the alignment camera 202. Since the alignment camera 202 has been optically aligned with the refractor device 138 (including the refractor light source 142 and the refractor camera 144) through a series of pre-alignments steps, when the anatomical feature of the eye (e.g., the limbus) is within the fixed reticle graphic 804 (e.g., the central circular shape), the eye of the subject is considered to be aligned with the refractor device 138.

One technical problem faced by the applicants is how to provide clinicians or operators the ability to quickly confirm that the measured eye of the subject is aligned with the various components of the system 100 without having to physically adjust any of the components of the system 100. One technical solution discovered and developed by the applicants is the display window 808 shown in the alignment GUI 800 (as well as the calibration GUI 900 and the accommodation GUI 1000, see FIGS. 11 and 12, respectively) where a fixed reticle graphic 804 is overlaid on real-time images 806 of the eye captured by the alignment camera 202. By providing this display window 808 on the alignment GUI 800 (as well as the calibration GUI 900 and the accommodation GUI 1000), the clinician or operator simply needs to quickly check the display window 808 to confirm that the subject's eye is aligned with the components of the system 100. If the clinician or operator discovers that the subject's eye has become misaligned (e.g., the limbus is not within the central circular shape of the fixed reticle graphic 804), the clinician or operator can adjust the head of the subject, the chinrest 104, or a combination thereof until the subject's eye is once again aligned.

Once the operator or clinician sees on the display window 808 of the alignment GUI 800 that the anatomical feature of the eye (e.g., the limbus) is within the fixed reticle graphic 804 (e.g., the central circular shape), the operator or clinician can apply a user input (e.g., a mouse-click or a touch input) to a check alignment button 810 to start the next part of the alignment procedure 704.

In some embodiments, applying the user input to the check alignment button 810 can activate or start the refractor device 138. In other embodiments, the refractor device 138 can be activated or started by the operator or clinician before the check alignment button 810 is pressed.

Once the operator or clinician applies the user input to the check alignment button 810, the controller 128 can be programmed to direct the far display 108 to display the stimulus target 200 for a first accommodation duration and to direct the near display 116 to display the stimulus target 200 (which is then projected onto the first beam splitter 118 for viewing by the subject) for a second accommodation duration. In some embodiments, the first accommodation duration can be less than the amount of time that the stimulus target 200 is displayed on the far display 108 during the actual accommodation procedure 708. For example, the first accommodation duration can be approximately 5 seconds while the stimulus target 200 is displayed for 10 seconds on the far display 108 for the actual assessment accommodation procedure 708. The second accommodation duration can also be less than the amount of time that the stimulus target 200 is displayed on the near display 116 during the actual assessment accommodation procedure 708 (for example, 5 seconds vs. 10 seconds for the actual assessment accommodation procedure 708).

The controller 128 can also be programmed to direct the appearance of the stimulus target 200 (either on the far display 108 or the near display 116) in the plurality of rotational orientations 602. For example, the controller 128 can direct the displays to show the stimulus target 200 as being upward-facing, leftward-facing, rightward-facing, or downward-facing. In response to the stimulus targets 200 displayed, the subject can be directed to apply user inputs 600 (e.g., joystick movements) to the input device 154 corresponding to the rotational orientations 602.

In some embodiments, the stimulus target 200 can be rotated in a random pattern (that is not a series of predictable clockwise or counterclockwise rotations). In other embodiments, the stimulus target 200 can partly be rotated in a set pattern (e.g., a clockwise or counterclockwise rotational pattern) and partly in a random pattern. Rotating the stimulus targets 200 and directing the subject to apply the user inputs 600 can keep the subject engaged during the alignment procedure 704.

The near display assembly 106 can be initially positioned at a stimulus position 110 furthest from the eye of the subject (such as the 0.80 meters stimulus position 110) prior to the stimulus target 200 being displayed. Once the stimulus target 200 is displayed on the far display 108 and the near display 116 in succession, the near display assembly 106 can be moved to the next stimulus position 110 (e.g., the stimulus position 110 closer to the eye of the subject). This process can be repeated until the near display assembly 106 is moved to the stimulus position 110 closest to the eye of the subject. In this manner, the stimulus targets 200 are presented in a way that mimics the presentation of the stimulus targets 200 during the accommodation procedure 708, albeit in an abbreviated fashion. During this time, the refractor device 138 is measuring a pupil diameter 812 and a gaze displacement 814 of the eye of the subject and transmitting such data to the controller 128.

The gaze displacement 814 of the eye can comprise a horizontal gaze displacement 816 (or a displacement in the gaze of the eye along the X-axis, see FIGS. 1 and 2) and a vertical gaze displacement 818 (or a displacement in the gaze of the eye along the Y-axis, see FIGS. 1 and 2). The horizontal gaze displacement 816 and the vertical gaze displacement 818 can be tracked by the refractor device 138 and the gaze displacement values can be graphed in real-time or near-real-time on a gaze chart 820 rendered as part of the alignment GUI 800.

In addition to the gaze chart 820, the pupil diameter 812 and the gaze displacement 814 measured by the refractor device 138 can be presented in an alignment measurement window 822 presented as part of the alignment GUI 800. In certain embodiments, a mean pupil diameter or a mean gaze displacement can be calculated and displayed in the alignment measurement window 822.

As previously discussed, certain predefined criteria or thresholds can be set concerning the alignment measurements such that the subject does not advance to the calibration phase or the calibration procedure 706 unless the alignment measurements meet the predefined criteria. The predefined criteria can comprise maximum values for the gaze displacement 814 and a minimum value for the pupil diameter 812.

For example, a maximum displacement threshold can be set for the gaze displacement 814. In some embodiments, the maximum displacement threshold can be approximately 5 degrees or 4 degrees. In other embodiments, the maximum displacement threshold can be less than 4 degrees such as 3 degrees or 2 degrees. The subject can be instructed to keep the subject's focus on the stimulus target 200 and not let their gaze wander or drift-off to prevent the horizontal gaze displacement 816 or the vertical gaze displacement 818 from exceeding the maximum displacement threshold.

Also, for example, a minimum diameter threshold can be set for the pupil diameter 812. In some embodiments, the minimum diameter threshold can be approximately 3.5 mm. In other embodiments, the minimum diameter threshold can be approximately 3.0 mm or 4.0 mm. If the subject's pupil diameter 812 is measured to be less than the minimum diameter threshold, a determination can be made by the clinician or operator as to whether applying non-cycloplegic dilation drops can increase the subject's pupil size. Non-cycloplegic drops can dilate the pupil without paralyzing the muscles that aid in focusing the eye.

FIG. 9 illustrates one embodiment of a calibration GUI 900 that can be displayed on the controller display 136 during the calibration procedure 706. An operator or clinician can access the alignment GUI 800 by selecting a calibration tab 902 on the main GUI.

The calibration GUI 900 can also comprise an instance of the display window 808 showing the fixed reticle graphic 804 overlaid on real-time images 806 of the eye captured by the alignment camera 202. Once the operator or clinician confirms that the anatomical feature of the eye (e.g., the limbus of the eye) is within the fixed reticle graphic 804 (e.g., the central circular shape) shown in the display window 808, the operator or clinician can proceed to calibrate the refractor device 138 to the eye of the subject and the testing/clinical environment. Calibration is needed since the eye pigments of a subject and ambient light in the testing/clinical environment can affect the intensity of light received and evaluated by the refractor device 138. As such, the refractor device 138 must be calibrated for each subject and each time the subject returns to the testing/clinical environment.

The calibration procedure 706 can comprise the operator or clinician placing an IR filter (a filter that blocks visible light and only allows IR light through) and a trial lens of a specific diopter strength or power in front of the eye of the subject. The subject is then directed to look at the stimulus target 200 shown on the far display 108 (with both eyes open). At this point, the operator or clinician can apply a user input (e.g., a mouse-click or a touch input) to a measure button 904 on the calibration GUI 900 to have the refractor device 138 take measurements of the refractive state of the eye covered by the trial lens.

A new trial lens of a different diopter strength can then be placed in front of the eye of the subject and new refraction measurements taken. These steps can be repeated until refraction measurements are obtained using trial lenses of several different diopter strengths. In some embodiments, trial lenses of the following diopter strengths can be used as part of the calibration procedure: +4.0 D, +3.0 D, +2.0 D, +1.0 D, 0.0, −1.5 D and −2.5 D.

The refraction measurements made by the refractor device 138 can be transmitted to or otherwise obtained by the controller 128. The controller 128 can then determine mean or average refraction values from the refraction measurements made by the refractor device 138. For example, the controller 128 can determine a mean or average refraction value for each trial lens of a specific diopter strength or power.

The controller 128 can then plot the different diopter strengths of the trial lenses against the average refraction values calculated from the refraction measurements made by the refractor device 138. The controller 128 can then be programmed to fit a line 906 to the datapoints of the different diopter strengths of the trial lenses plotted against the average refraction values using a regression technique (e.g., R-squared regression). Finally, the controller 128 can be programmed to calculate a slope of the line 906 to be used as a calibration factor 908. The calibration factor 908 can be used by the controller 128 to determine to an accommodative response of the eye of the subject.

As shown in FIG. 9, the calibration GUI 900 can comprise a graph window 910 that renders the plot and the fitted line 906. The calibration GUI 900 can also display the calculated slope of the line 906 that can be used as the calibration factor 908.

FIG. 10 illustrates one embodiment of an accommodation GUI 1000 that can be displayed on the controller display 136 during the accommodation procedure 708. An operator or clinician can access the accommodation GUI 1000 by selecting an accommodation tab 1002 on the main GUI. The operator or clinician can proceed to assess the accommodation of the eye only when the subject has successfully completed the alignment procedure 704 and the calibration procedure 706 (the output of the latter being a calculated calibration factor 908).

The accommodation GUI 1000 can also comprise an instance of the display window 808 showing the fixed reticle graphic 804 overlaid on real-time images 806 of the eye captured by the alignment camera 202. Once the operator or clinician has confirmed once again that the anatomical feature of the eye (e.g., the limbus of the eye) is within the fixed reticle graphic 804 (e.g., the central circular shape) shown in the display window 808, the operator or clinician can proceed to the accommodation assessment by applying a user input (e.g., a mouse-click or a touch input) to a start test button 1004 on the accommodation GUI 1000.

In response to the user input to the start test button 1004, the controller 128 can be programmed to direct appearance of the stimulus target 200 on the far display 108 for a first duration of time and on the near display 116 for a second duration of time. In some embodiments, the near display assembly 106 comprising the near display 116 can be positioned at or moved to a stimulus position 110 furthest from the eye of the subject (such as the 0.80 meters stimulus position 110) prior to the stimulus target 200 being displayed. The stimulus target 200 displayed on the near display 116 can be projected onto the first beam splitter 118 for viewing by the subject.

As previously discussed, the stimulus target 200 can be displayed in a plurality of rotational orientations 602 (e.g., the stimulus target 200 can be rotated randomly). The subject can be instructed to focus on the stimulus target 200 and to keep the stimulus target 200 as sharp as possible. The subject can also be instructed to apply user inputs 600 to the input device 154 (e.g., move a joystick in various directions) to match the rotational orientations 602 of the stimulus target 200.

During the first duration of time and the second duration of time, the refractor device 138 can continuously take measurements of the refractive state of the eye. For example, the refractor device 138 can be capable of taking measurements at a rate of 50 Hz or one measurement every 20 ms. The refraction measurements can be transmitted to the controller 128 or otherwise obtained by the controller 128 from the refractor device 138.

Figure 11:
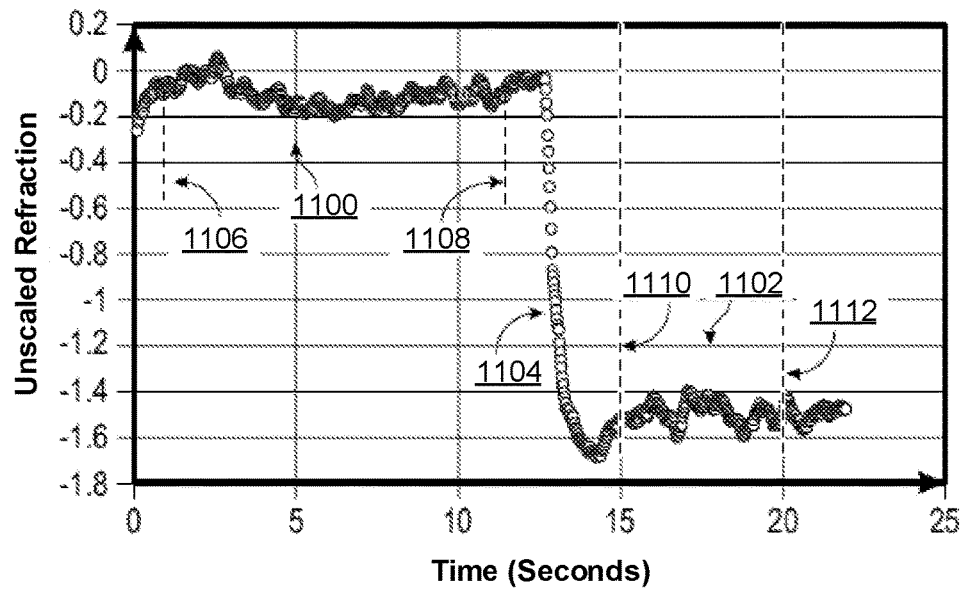
FIG. 11 is a graph visualizing raw or unscaled refraction measurements made by a refractor device as a function of time.

In some embodiments, the refraction measurement received from the refractor device 138 can be raw or unscaled refraction measurements (see, e.g., FIG. 11). The raw or unscaled refraction measurements can be multiplied by the calibration factor 908 (see, e.g., FIG. 9) and the resulting scaled refraction measurements can be plotted against the time (in seconds) and displayed in a refraction chart 1006 on the accommodation GUI 1000.

The controller 128 can also be programmed to calculate mean or average refraction values from the refraction measurements taken by the refractor device 138 when the stimulus target 200 is displayed at the far display 108 and the near display 116/first beam splitter 118.

In some embodiments, an accommodative response 1008 at that particular stimulus position 110 can be calculated by subtracting the mean near refraction value ($X_N$) from the mean far refraction value ($X_F$) and multiplying the result by the calibration factor (CF) 908 calculated from the calibration procedure 706 (see Formula I above).

The mean near refraction value ($X_N$) and the mean far refraction value ($X_F$) in Formula I are raw refraction measurements that have not been scaled by the calibration factor 908.

Accommodative responses can also be determined at other stimulus positions 110 (for example, at three or more other stimulus positions 110). For example, the near display assembly 106 can be initially positioned at a stimulus position 110 furthest from the eye of the subject (such as the 0.80 meters stimulus position 110) prior to the stimulus target 200 being displayed. Once the stimulus target 200 is displayed on the far display 108 and the near display 116 in succession, the near display assembly 106 can be moved to the next stimulus position 110 (e.g., the stimulus position 110 closer to the eye of the subject). This process can be repeated until the near display assembly 106 is moved to the stimulus position 110 closest to the eye of the subject (e.g., the 4.0 D or the 0.25 meters stimulus position 110). The accommodative responses calculated at each stimulus position 110 can be listed in an accommodation table 1010 included as part of the accommodation GUI 1000 and/or presented as a report to be printed out by the operator or clinician.

FIG. 11 is a graph visualizing raw or unscaled refraction measurements made by the refractor device 138 as a function of time. Refraction values are shown on the vertical axis and time in seconds is shown on the horizontal axis. The refraction measurements can comprise a number of far refraction measurements 1100 made by the refractor device 138 during a first duration of time (when the stimulus target 200 is displayed at the far display 108) and a number of near refraction measurements 1102 made by the refractor device 138 during a second duration of time (when the stimulus target 200 is displayed at the near display 116 and projected onto the first beam splitter 118 for viewing). A transition segment 1104 showing a number of measurements made during a transition period can separate the far refraction measurements 1100 from the near refraction measurements 1102.

The first duration of time can begin at a first time 1106 and end at a second time 1108. For example, the first duration of time can be between about 5 seconds and 20 seconds (e.g., about 10 seconds). The second duration of time can begin at a third time 1110 and end at a fourth time 1112. For example, the second duration of time can also be between about 5 seconds and 20 seconds (e.g., about 10 seconds). The refractor device 138 can be capable of taking measurements at a rate of 50 Hz or one measurement every 20 ms.

The far refraction measurements 1100 can be averaged to obtain a mean far refraction value ($X_F$). The near refraction measurements 1102 can be averaged to obtain a mean near refraction value ($X_N$).

In some embodiments, the accommodative response at that particular stimulus position 110 can be calculated by subtracting the mean near refraction value ($X_N$) from the mean far refraction value ($X_F$) and multiplying the result by the calibration factor (CF) calculated from the calibration procedure 706 (see Formula I above).

In other embodiments, the raw or unscaled refraction measurements made by the refractor device 138 can be multiplied by the calibration factor 908 first and the resulting scaled refraction measurements can be plotted against the time (in seconds) and displayed in the refraction chart 1006 shown via the accommodation GUI 1000 (see, e.g., FIG. 10). When scaled refraction measurements are calculated (using a negative slope/calibration factor), a mean scaled near refraction value and a mean scaled far refraction value can be calculated and the accommodative response, in this case, is simply the mean scaled far refraction subtracted from the mean scaled near refraction.

The accommodative response can also be determined at other stimulus positions 110 (for example, at three or more other stimulus positions 110) by repeating the same calculation using refractions measurements made by the refractor device 138 when the stimulus target 200 is shown at those other stimulus positions 110. For example, a response curve 1202 (see, e.g., FIG. 12) can then be plotted to evaluate the subject's accommodative ability.

Figure 12:
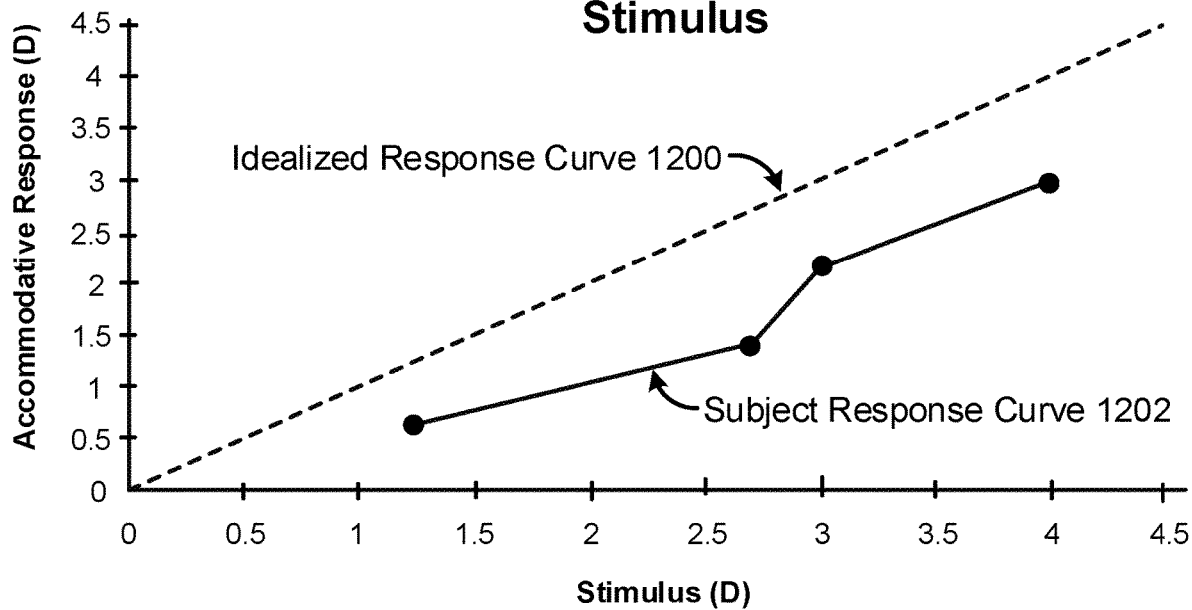
FIG. 12 graph showing both an idealized response curve and a subject response curve based on an accommodative response calculated at each stimulus position.

FIG. 12 is a graph showing both an idealized response curve 1200 (perfect accommodation) and a subject response curve 1202 based on the subject's accommodative response calculated at each stimulus position 110. The subject response curve 1202 can be compared against the idealized response curve 1200 to evaluate the subject's accommodative ability. Additional response curves 1202 can also be generated based on additional accommodative response values calculated from additional test runs or testing cycles.

The subject's accommodative response calculated at each stimulus position 110 can also be stored as part of a matrix or table. The subject's accommodative response calculated at each stimulus position 110 and the subject response curve 1202 can be stored for further evaluation by a clinician or other medical professional and can be also compared against previous or future accommodation data obtained from the subject.

A number of embodiments have been described. Nevertheless, it will be understood by one of ordinary skill in the art that various changes and modifications can be made to this disclosure without departing from the spirit and scope of the embodiments. Elements of systems, devices, apparatus, and methods shown with any embodiment are exemplary for the specific embodiment and can be used in combination or otherwise on other embodiments within this disclosure. For example, the steps of any methods depicted in the figures or described in this disclosure do not require the particular order or sequential order shown or described to achieve the desired results. In addition, other steps operations may be provided, or steps or operations may be eliminated or omitted from the described methods or processes to achieve the desired results. Moreover, any components or parts of any apparatus or systems described in this disclosure or depicted in the figures may be removed, eliminated, or omitted to achieve the desired results. In addition, certain components or parts of the systems, devices, or apparatus shown or described herein have been omitted for the sake of succinctness and clarity.

Accordingly, other embodiments are within the scope of the following claims and the specification and/or drawings may be regarded in an illustrative rather than a restrictive sense.

Each of the individual variations or embodiments described and illustrated herein has discrete components and features which may be readily separated from or combined with the features of any of the other variations or embodiments. Modifications may be made to adapt a particular situation, material, composition of matter, process, process act(s) or step(s) to the objective(s), spirit, or scope of the present invention.

Methods recited herein may be carried out in any order of the recited events that is logically possible, as well as the recited order of events. Moreover, additional steps or operations may be provided or steps or operations may be eliminated to achieve the desired result.

Furthermore, where a range of values is provided, every intervening value between the upper and lower limit of that range and any other stated or intervening value in that stated range is encompassed within the invention. Also, any optional feature of the inventive variations described may be set forth and claimed independently, or in combination with any one or more of the features described herein. For example, a description of a range from 1 to 5 should be considered to have disclosed subranges such as from 1 to 3, from 1 to 4, from 2 to 4, from 2 to 5, from 3 to 5, etc. as well as individual numbers within that range, for example 1.5, 2.5, etc. and any whole or partial increments therebetween.

All existing subject matter mentioned herein (e.g., publications, patents, patent applications) is incorporated by reference herein in its entirety except insofar as the subject matter may conflict with that of the present invention (in which case what is present herein shall prevail). The referenced items are provided solely for their disclosure prior to the filing date of the present application. Nothing herein is to be construed as an admission that the present invention is not entitled to antedate such material by virtue of prior invention.

Reference to a singular item, includes the possibility that there are plural of the same items present. More specifically, as used herein and in the appended claims, the singular forms "a," "an," "said" and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation. Unless defined otherwise, all technical and scientific terms used herein have the same meaning as commonly understood by one of ordinary skill in the art to which this invention belongs.

Reference to the phrase "at least one of", when such phrase modifies a plurality of items or components (or an enumerated list of items or components) means any combination of one or more of those items or components. For example, the phrase "at least one of A, B, and C" means: (i) A; (ii) B; (iii) C; (iv) A, B, and C; (v) A and B; (vi) B and C; or (vii) A and C.

In understanding the scope of the present disclosure, the term "comprising" and its derivatives, as used herein, are intended to be open-ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" "element," or "component" when used in the singular can have the dual meaning of a single part or a plurality of parts. As used herein, the following directional terms "forward, rearward, above, downward, vertical, horizontal, below, transverse, laterally, and vertically" as well as any other similar directional terms refer to those positions of a device or piece of equipment or those directions of the device or piece of equipment being translated or moved.

Finally, terms of degree such as "substantially", "about" and "approximately" as used herein mean the specified value or the specified value and a reasonable amount of deviation from the specified value (e.g., a deviation of up to ±0.1%, ±1%, ±5%, or ±10%, as such variations are appropriate) such that the end result is not significantly or materially changed. For example, "about/approximately 1.0 m" can be interpreted to mean "1.0 m" or between "0.9 m and 1.1 m." When terms of degree such as "about" or "approximately" are used to refer to numbers or values that are part of a range, the term can be used to modify both the minimum and maximum numbers or values.

This disclosure is not intended to be limited to the scope of the particular forms set forth, but is intended to cover alternatives, modifications, and equivalents of the variations or embodiments described herein. Further, the scope of the disclosure fully encompasses other variations or embodiments that may become obvious to those skilled in the art in view of this disclosure.

We claim:

1. A system for objectively assessing accommodation in an eye of a subject, the system comprising:
    a near display and a first beam splitter positioned at an oblique angle with respect to the near display;
    a far display located further from the eye than the near display and the first beam splitter; and
    a controller in communication with the near display and the far display, the controller comprising one or more processors and a tangible non-transitory machine-readable medium comprising instructions stored thereon, wherein execution of the instructions by the one or more processors causes the controller to:
        direct appearance of a stimulus target on the far display for a first duration and on the near display for a second duration, wherein the near display is configured to project the stimulus target onto the first beam splitter, wherein the stimulus target displayed on the far display is axially aligned with the stimulus target projected onto the first beam splitter,
        obtain measurements concerning refractive states of the eye during the first duration and the second duration from a refractor device in communication with the controller, and
        determine an accommodative response of the eye based in part on the refractive states.

2. The system of claim 1, further comprising:
    a support assembly; and
    a motorized stage coupled to a top of the support assembly, wherein the motorized stage is configured to translate the near display and the first beam splitter in a linear direction, wherein the first beam splitter is configured to be translated to a plurality stimulus positions, and wherein the near display is oriented in a downward direction.

3. The system of claim 2, wherein the stimulus positions are located at approximately 0.80 meters, 0.37 meters, 0.33 meters, and 0.25 meters from the eye of the subject.

4. The system of claim 1, wherein the far display is located between approximately 4 meters and 6 meters from the eye of the subject.

5. The system of claim 1, further comprising:
    an angled mirror; and
    a hot mirror positioned above the angled mirror and in between the near display and the subject; and
    wherein the refractor device comprises:
        a refractor light source configured to generate an illumination beam, wherein the angled mirror and the hot mirror are configured to steer the illumination beam to the eye of the subject;
        a refractor camera configured to capture or detect light reflected by the eye in response to the illumination beam, wherein the light reflected by the eye is steered back toward the refractor device via the hot mirror and the angled mirror; and
        one or more refractor processors configured to determine a refractive state of the eye based on the light reflected by the eye.

6. The system of claim 5, further comprising:
    a second beam splitter positioned in a line-of-sight of the eye at a distal end of a support assembly in between the near display assembly and the far display;
    an alignment camera in communication with the controller and configured to capture real-time images of the eye, wherein the alignment camera is positioned offset from the line-of-sight of the eye, and wherein the second beam splitter is configured to reflect images of the eye of the subject toward the alignment camera; and
    a controller display in communication with the controller and configured to display a graphical user interface (GUI) showing the real-time images of the eye captured by the alignment camera, wherein the GUI further shows a fixed reticle graphic overlaid on the real-time images of the eye, wherein the eye of the subject is optically aligned with the refractor device when the GUI shows an anatomical feature of the eye within at least part of the fixed reticle graphic.

7. The system of claim 1, wherein the one or more processors of the controller are configured to execute further instructions to cause the controller to:
    obtain, from the refractor device, measurements concerning a pupil diameter and a gaze displacement of the eye; and proceed to determine the accommodative response of the eye only when the pupil diameter exceeds a minimum diameter threshold and the gaze displacement is less than a maximum displacement threshold.

8. The system of claim 6, wherein a line-of-sight of the eye of the subject extends through the hot mirror, the first beam splitter, and the second beam splitter such that the subject views the stimulus target displayed on the far display through the hot mirror, the first beam splitter, and the second beam splitter.

9. The system of claim 6, further comprising a far alignment light source positioned at the distal end of the support assembly, wherein the far alignment light source is configured to project a light marker onto the far display via the second beam splitter, and wherein the stimulus target is displayed on the far display within a region encompassing the light marker.

10. The system of claim 1, further comprising:
an input device configured to receive user inputs from the subject concerning the stimulus target displayed on at least one of the near display and the far display; and
wherein the input device is in communication with the controller, and wherein the one or more processors are configured to execute further instructions to cause the controller to:
direct the appearance of the stimulus target on the far display in a plurality of first rotational orientations for the first duration,
receive user inputs from the input device corresponding to the first rotational orientations,
direct the appearance of the stimulus target on the near display in a plurality of second rotational orientations for the second duration, and
receive user inputs from the input device corresponding to the second rotational orientations.

11. The system of claim 10, wherein the input device is a joystick and wherein each of the user inputs is a joystick movement initiated by the subject in a direction associated with a rotational orientation of the stimulus target displayed on either the near display or the far display.

12. The system of claim 1, wherein the one or more processors of the controller are configured to execute further instructions to cause the controller to:
obtain refraction data concerning the eye of the subject during a calibration procedure from the refractor device, wherein the calibration procedure comprises:
placing an infrared filter in front of the eye,
placing each of a plurality of trial lenses of different diopter strengths in front of the eye in sequence, and
directing the subject to look at the far display and concurrently measuring the refractive state of the eye for each of the trial lenses using the refractor device;
fit a line to datapoints of the different diopter strengths of the trial lenses plotted against averages of the refractive states measured using a regression technique; and
calculate a slope of the line to be used as a calibration factor.

13. The system of claim 12, wherein the one or more processors of the controller are configured to execute further instructions to cause the controller to calculate the accommodative response of the eye using the formula below:

$$\text{Accommodative Response} = CF^*(X_F - X_N)$$

wherein CF is the calibration factor, wherein $X_F$ is a mean far refraction value calculated using measurements made during the first duration when the stimulus target is displayed on the far display, and wherein $X_N$ is a mean near refraction value calculated using measurements made during the second duration when the stimulus target is displayed on the near display.

14. The system of claim 1, wherein the stimulus target is an optotype letter.

15. The system of claim 1, wherein the stimulus target has a height dimension of between approximately 1.5 cm and 2.0 cm.

16. The system of claim 1, wherein the far display is a light-emitting diode (LED) display.

17. The system of claim 1, wherein the near display is a light-emitting diode (LED) display.

18. The system of claim 1, wherein the far display is a liquid crystal display (LCD) screen.

19. The system of claim 9, wherein the far alignment light source is a laser pointer.

20. The system of claim 10, wherein the input device is a keyboard.

* * * * *